(12) United States Patent
Tie et al.

(10) Patent No.: US 9,673,880 B2
(45) Date of Patent: Jun. 6, 2017

(54) PILOT SIGNAL TRANSMISSION METHOD, CHANNEL ESTIMATION METHOD, AND APPARATUS AND SYSTEM

(71) Applicant: Huawei Technologies Co., Ltd., Shenzhen, Guangdong (CN)

(72) Inventors: Xiaolei Tie, Sanghai (CN); Huan Zhou, Shenzhen (CN); Gengshi Wu, Shanghai (CN); Meng Hua, Shanghai (CN); Wenquan Hu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 112 days.

(21) Appl. No.: 14/293,772

(22) Filed: Jun. 2, 2014

(65) Prior Publication Data

US 2014/0307718 A1 Oct. 16, 2014

Related U.S. Application Data

(63) Continuation of application No. PCT/CN2013/070804, filed on Jan. 21, 2013.

(30) Foreign Application Priority Data

Jan. 21, 2012 (CN) .......................... 2012 1 0019896

(51) Int. Cl.
*H04B 7/06* (2006.01)
*H04L 5/00* (2006.01)
(Continued)

(52) U.S. Cl.
CPC ......... *H04B 7/0608* (2013.01); *H04B 7/0465* (2013.01); *H04B 7/0684* (2013.01);
(Continued)

(58) Field of Classification Search
CPC ...... H04B 1/0483; H04B 7/08; H04B 7/0417; H04B 7/0413; H04B 7/0456;
(Continued)

(56) References Cited

U.S. PATENT DOCUMENTS

2004/0233872 A1* 11/2004 Lobinger ............. H04B 7/0613
370/334
2006/0018287 A1 1/2006 Walton et al.
(Continued)

FOREIGN PATENT DOCUMENTS

CN 101023643 A 8/2007
CN 101310454 A 11/2008
(Continued)

OTHER PUBLICATIONS

"Pilot design for DL 4-branch MIMO," 3GPP TSG-RAN WG1 Meeting #66bis, Zhuhai, China, R1-112978, $3^{rd}$ Generation Partnership Project, Valbonne, France (Oct. 10-14, 2011).
(Continued)

*Primary Examiner* — John Pezzlo
*Assistant Examiner* — Dharmesh Patel
(74) *Attorney, Agent, or Firm* — Leydig, Voit & Mayer, Ltd.

(57) ABSTRACT

A pilot signal transmission method, a channel estimation method, and an apparatus are provided, and the method for a pilot signal transmission includes: transmitting a pilot signal 1 CPICH1 over a first antenna, and transmitting a pilot signal 2 CPICH2 over a second antenna; transmitting a pilot signal CPICHk1 over a $k1^{th}$ antenna; and when it is determined that a terminal of a first category in the MIMO system is scheduled, transmitting a pilot signal $CPICH_{k2}$ over the $k1^{th}$ antenna. Interference caused by a pilot signal to a traditional terminal is better reduced, performance of the traditional terminal is ensured while the terminal of the first
(Continued)

category properly works in the MIMO system, and power consumption for transmitting a pilot signal is effectively reduced.

19 Claims, 9 Drawing Sheets

(51) Int. Cl.
H04B 7/04 (2017.01)
H04W 52/32 (2009.01)
H04B 7/0413 (2017.01)
H04L 25/02 (2006.01)

(52) U.S. Cl.
CPC ............ H04L 5/005 (2013.01); H04L 5/0023 (2013.01); H04L 5/0062 (2013.01); H04W 52/325 (2013.01); *H04B 7/0413* (2013.01); *H04L 25/0226* (2013.01)

(58) Field of Classification Search
CPC .. H04B 7/0486; H04B 7/0617; H04B 7/0619; H04B 7/626; H04B 7/0667; H04B 7/0684; H04B 7/0691; H04L 5/005; H04L 5/0023; H04L 5/0048; H04L 5/0051; H04L 25/0204; H04L 25/0206; H04L 25/0226; H04L 25/0232; H04L 27/2626; H04L 2025/03808
See application file for complete search history.

(56) References Cited

U.S. PATENT DOCUMENTS

2006/0023666 A1* 2/2006 Jalali .................. H04L 5/023
370/334
2007/0071127 A1 3/2007 Gore et al.
2010/0061344 A1* 3/2010 Goransson ........... H04B 7/0697
370/335
2011/0077019 A1 3/2011 De Pasquale et al.

FOREIGN PATENT DOCUMENTS

| CN | 101989970 A | 3/2011 |
| CN | 102655486 A | 9/2012 |
| EP | 2026518 A2 | 2/2009 |

OTHER PUBLICATIONS

"Pilot design options for 4-Tx MIMO for HSDPA," 3GPP TSG-RAN WG1 Meeting #66bis, Zhuhai, China, R1-113410, $3^{rd}$ Generation Partnership Project, Valbonne, France (Oct. 10-14, 2011).
"Initial discussion on pilot design for 4-branch MIMO," 3GPP TSG-RAN WG1 Meeting #66bis, Zhuhai, China, R1-113431, $3^{rd}$ Generation Partnership Project, Valbonne, France (Oct. 10-14, 2011).
"Initial evaluation results for pilot design," 3GPP TSG-RAN WG1 Meeting #67, San Francisco, USA, R1-113846, $3^{rd}$ Generation Partnership Project, Valbonne, France (Nov. 14-18, 2011).
"On the pilot design for 4-branch MIMO," 3GPP TSG-RAN WG1 Meeting #67, San Francisco, USA, R1-114034, $3^{rd}$ Generation Partnership Project, Valbonne, France (Nov. 14-18, 2011).
"$3^{rd}$ Generation Partnership Project; Technical Specification Group Radio Access Network; Physical channels and mapping of transport channels onto physical channels (FDD) (Release 11)," 3GPP TS 25.211, V11.0.0, pp. 1-60, $3^{rd}$ Generation Partnership Project, Valbonne, France (Dec. 2011).
"$3_{rd}$ Generation Partnership Project; Technical Specification Group Radio Access Network; Physical layer procedures (FDD) (Release 11)," 3GPP TS 25.214, V11.0.0, pp. 1-106, $3^{rd}$ Generation Partnership Project, Valbonne, France (Dec. 2011).

* cited by examiner

PILOT SIGNAL TRANSMISSION METHOD, CHANNEL ESTIMATION METHOD, AND APPARATUS AND SYSTEM

CROSS-REFERENCE TO RELATED APPLICATIONS

This application is a continuation of International Patent Application No. PCT/CN2013/070804, filed on Jan. 21, 2013, which claims priority to Chinese Patent Application No. 201210019896.9, filed on Jan. 21, 2012, both of which are hereby incorporated by reference in their entireties.

TECHNICAL FIELD

The present invention relates to the field of pilot signal transmission in a Multiple-Input Multiple-Output (MIMO) system, and in particular, to a pilot signal transmission method, a channel estimation method, an apparatus, and a system.

BACKGROUND

A MIMO system supports multiple-input multiple-output transmission from multiple transmit antennas to multiple receive antennas. Certainly, the MIMO system is also compatible with Single-Input Single-Output (SISO) transmission and the like.

In the MIMO system, generally, a wireless channel between a base station and a terminal needs to be estimated to restore data transmitted over the wireless channel Generally, a pilot signal is transmitted from the base station, and the pilot signal is received by the terminal to perform a channel estimation. The pilot signal is composed of a pilot sequence that is learnt by both the base station and the terminal in advance, and therefore the terminal can perform the channel estimation based on the received pilot signal and the pilot sequence learnt in advance. In the MIMO system, functions of performing the channel estimation by using the pilot signal are categorized into two types:

One type is performing channel sounding, used to enable the terminal to estimate Channel State Information (CSI), including Channel Quality Indicator (CQI) estimation, rank information estimation, and Pre-Coding Indication (PCI) information estimation, and the like. After completing the CSI information estimation, the terminal feeds back the CSI information to the base station over an uplink feedback channel; and the other type is used for data demodulation.

In a 4 Branch MIMO system, that is, a 4×4 (4-input 4-output) MIMO system, a 4×2 (4-input 2-output) MIMO system, or a 4×1 (4-input 1-output) MIMO system, pilot signals are required to be transmitted over four antennas of a base station to support channel estimations performed by a 4 Branch MIMO terminal (including a 4×4 MIMO terminal, a 4×2 MIMO terminal, or a 4×1 MIMO terminal), so that the terminal may further perform a CSI estimation and data demodulation. If power for transmitting a pilot signal transmitted over a third or a fourth antenna is too high, however, a great interference may be caused to a traditional terminal, thereby affecting performance of the traditional terminal.

Therefore, how to reduce interference to the traditional terminal caused by transmitting a pilot signal over the third or the fourth antenna while ensuring performance of the 4 Branch MIMO terminal becomes a major factor that needs to be considered during pilot design for the 4 Branch MIMO system.

SUMMARY

Embodiments of the present invention provide a pilot signal transmission method, a channel estimation method, an apparatus, and a system, which may better reduce interference caused by a pilot signal to a traditional terminal in a MIMO system.

An embodiment of the present invention provides a pilot signal transmission method, including:

in a MIMO system, transmitting a pilot signal 1 CPICH1 over a first antenna, and transmitting a pilot signal 2 CPICH2 over a second antenna;

transmitting a pilot signal $CPICH_{k1}$ over a $k1^{th}$ antenna, where k1 is an integer greater than 2 and smaller than or equal to M; and upon determining that a terminal of a first category in the MIMO system is scheduled within a Transmission Time Interval (TTI), additionally transmitting a pilot signal $CPICH_{k2}$ over the $k1^{th}$ antenna within the TTI, where k2=M−2+k1.

An embodiment of the present invention further provides a channel estimation method, including:

in a MIMO system, detecting, by a terminal of a first category, whether the terminal is scheduled within a TTI; where if detecting that the terminal is scheduled, acquiring, within the TTI, a CPICH1, a CPICH2, a $CPICH_{k1}$, and a $CPICH_{k2}$ to perform a channel estimation; and if detecting that the terminal is not scheduled, acquiring, within the TTI, a CPICH1, a CPICH2, and a $CPICH_{k1}$ to perform a channel estimation; where the CPICH1 and the CPICH2 are pilot signals transmitted over a first antenna and a second antenna on a base station side, the $CPICH_{k1}$ is a pilot signal transmitted over a $k1^{th}$ antenna on the base station side, and the $CPICH_{k2}$ is a pilot signal transmitted over the $k1^{th}$ antenna when it is determined that a terminal of the first category in the MIMO system is scheduled on the base station side within the TTI, where k1 is an integer greater than 2 and smaller than or equal to M, and k2=M−2+k1.

An embodiment of the present invention further provides another channel estimation method in a MIMO system, including:

in a MIMO system, detecting, by a terminal of a first category, whether the terminal is scheduled within a TTI; where if detecting that the terminal is scheduled, acquiring, within the TTI, a CPICH1, a CPICH2, a $CPICH_{k1}$, and a $CPICH_{k2}$ to perform a channel estimation; and if detecting that the terminal is not scheduled, further detecting whether another terminal of the first category is scheduled within the TTI; if another terminal of the first category is scheduled within the TTI, acquiring a CPICH1, a CPICH2, a $CPICH_{k1}$, and a $CPICH_{k2}$ to perform a channel estimation within the TTI; if no other terminal of the first category is scheduled within the TTI, acquiring a CPICH1, a CPICH2, and a $CPICH_{k1}$ to perform a channel estimation within the TTI; where the CPICH1 and the CPICH2 are pilot signals transmitted over a first antenna and a second antenna on a base station side, the $CPICH_{k1}$ is a pilot signal transmitted over a $k1^{th}$ antenna on the base station side, and the $CPICH_{k2}$ is a pilot signal transmitted over the $k1^{th}$ antenna when it is determined that a terminal of the first category in the MIMO system is scheduled on the base station side within the TTI, where k1 is an integer greater than 2 and is smaller than or equal to M, and k2=M−2+k1.

An embodiment of the present invention further provides a pilot signal transmission control apparatus, where the pilot signal transmission control apparatus is configured to control, in a MIMO system, transmission of a pilot signal over an antenna of a base station, including a control module, where the control module is configured to control transmission of a CPICH1 over a first antenna of the base station and transmission of a CPICH2 over a second antenna of the base station;

control transmission of a pilot signal $CPICH_{k1}$ over a $k1^{th}$ antenna of the base station, where k1 is an integer greater than 2 and smaller than or equal to M; and upon determining that a terminal of a first category in the MIMO system is scheduled within a TTI, transmit a pilot signal $CPICH_{k2}$ over the $k1^{th}$ antenna within the TTI, where k2=M−2+k1.

An embodiment of the present invention further provides a MIMO terminal, where the MIMO terminal is a terminal of a first category in a MIMO system, and the terminal includes:

a detection module, configured to detect, within each TTI, whether the terminal itself is scheduled;

a channel estimation module, configured to acquire, within a TTI, a CPICH1, a CPICH2, a $CPICH_{k1}$, and a $CPICH_{k2}$ to perform a channel estimation when the detection module detects that the terminal itself is scheduled within the TTI; and if the detection module detects that the terminal itself is not scheduled, acquire, within the TTI, a CPICH1, a CPICH2, and a $CPICH_{k1}$ to perform a channel estimation; where the CPICH1 and the CPICH2 are pilot signals transmitted over a first antenna and a second antenna on a base station side, the $CPICH_{k1}$ is a pilot signal transmitted over a $k1^{th}$ antenna on the base station side, and the $CPICH_{k2}$ is a pilot signal transmitted over the $k1^{th}$ antenna within a TTI when it is determined that a terminal of the first category in the MIMO system is scheduled on the base station side within the TTI, where k1 is an integer greater than 2 and smaller than or equal to M, and k2=M−2+k1.

An embodiment of the present invention further provides another MIMO terminal, where the MIMO terminal is a terminal of a first category in a MIMO system, and the terminal includes:

a first detection module, configured to detect, within a TTI, whether a terminal itself is scheduled;

a second detection module, configured to further detect whether another terminal of the first category is scheduled within the TTI when the first detection module detects that the terminal itself is not scheduled;

a channel estimation module, configured to acquire a CPICH1, a CPICH2, a $CPICH_{k1}$, and a $CPICH_{k2}$ to perform a channel estimation within the TTI when the first detection module detects that the terminal itself is scheduled within the TTI;

and is configured to call the second detection module to detect whether another terminal of the first category is scheduled within the TTI when the first detection module detects that the terminal itself is not scheduled within the TTI, acquire a CPICH1, a CPICH2, a $CPICH_{k1}$, and a $CPICH_{k2}$ to perform a channel estimation within the TTI when the second detection module detects that another terminal of the first category is scheduled within the TTI, and acquire a CPICH1, a CPICH2, and a $CPICH_{k1}$ to perform a channel estimation within the TTI if the second detection module detects that no other terminal of the first category is scheduled; and the CPICH1 and the CPICH2 are pilot signals transmitted over a first antenna and a second antenna on a base station side, the $CPICH_{k1}$ is a pilot signal transmitted over a $k1^{th}$ antenna on the base station side, and the $CPICH_{k2}$ is a pilot signal transmitted over the $k1^{th}$ antenna within a TTI when it is determined that a terminal of the first category in the MIMO system is scheduled on the base station side within the TTI, where k1 is an integer greater than 2 and smaller than or equal to M, and k2=M−2+k1.

An embodiment of the present invention further provides a MIMO system, including a base station and multiple mobile terminals, where the multiple mobile terminals at least include either of the foregoing MIMO terminals, and the base station includes the pilot signal transmission control apparatus.

The embodiments of the present invention determine, according to a situation in which a terminal of a first category in a MIMO system is scheduled, whether to additionally transmit a new pilot signal over another antenna except a first antenna and a second antenna, thereby better reducing interference to a traditional terminal in the MIMO system, on a basis of being compatible with the traditional terminal, and ensuring CSI estimation and demodulation performance of the terminal of the first category in the MIMO system. Therefore, while ensuring performance of the terminal of the first category, the embodiments of the present invention also ensure performance of the traditional terminal, reduce impact on the traditional terminal caused by introducing a 4 Branch MIMO or an 8 Branch MIMO, and effectively reduce power consumption for transmitting a pilot signal.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
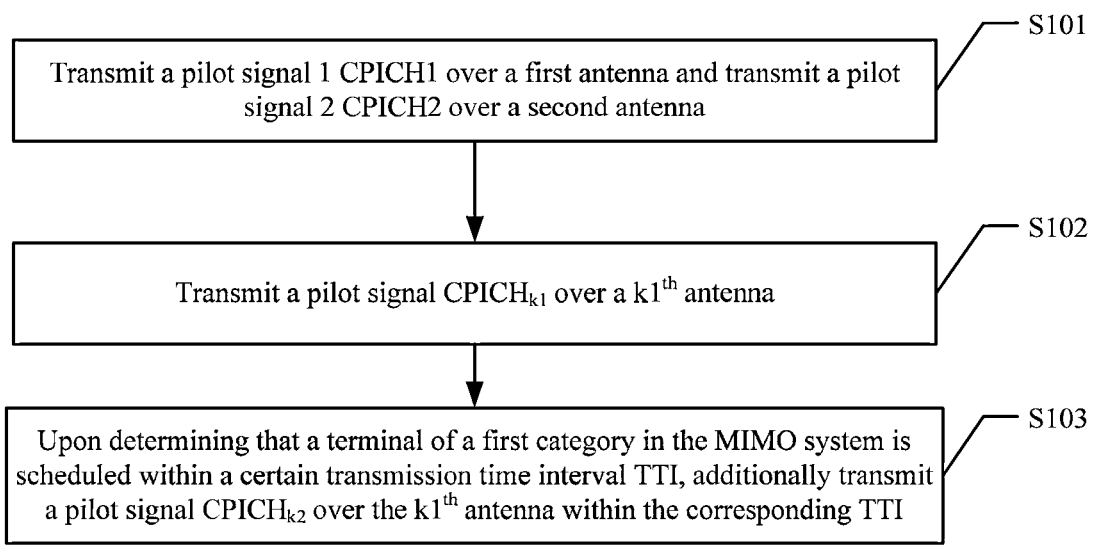
FIG. 1 is a schematic flowchart of a pilot signal transmission method according to a first embodiment.

Referring to FIG. 1, FIG. 1 is a flowchart of a pilot signal transmission method according to a first embodiment of the present invention. The method according to this embodiment is applicable to 4 Branch MIMO systems that include a 4×4 MIMO system, a 4×2 MIMO system, and a 4×1 MIMO system, and to 8 Branch MIMO systems that include an 8×8 (8-input 8-output) MIMO system, an 8×4 (8-input 4-output) MIMO system, and an 8×2 (8-input 2-output) MIMO system, and the like. By respectively transmitting a corresponding pilot signal over a base station, all terminals within a coverage area of the base station can properly perform channel estimations. Specifically, the method according to this embodiment includes:

S101: Transmit a pilot signal 1 CPICH1 over a first antenna and transmit a pilot signal 2 CPICH2 over a second antenna;

a base station in a 4 Branch MIMO system may include 4 antennas and a base station in an 8 Branch MIMO system may include 8 antennas, the rest may be deduced in analogy. In these systems, in S101, within all TTIs, a pilot signal 1 CPICH1 is transmitted over a first antenna and a pilot signal 2 CPICH2 is transmitted over a second antenna to be compatible with non-MIMO terminals such as a single-input single-output terminal, a single-input double-output terminal, a 2×1 (double-input single-output) MIMO terminal and a 2×2 (double-input double-output) MIMO terminal. It should be noted that, in addition to enabling a traditional terminal to perform a channel estimation, the CPICH1 and the CPICH2 may also be used by other MIMO terminals (such as a 4 Branch MIMO terminal and an 8 Branch MIMO terminal) to perform a channel estimation.

The CPICH1 and the CPICH2 are pilot signals transmitted according to power required by all terminals, within the coverage area, to perform both a channel state information CSI estimation and a channel estimation used for data demodulation; or, when no 2×1 MIMO terminal or 2×2 MIMO terminal exists in a system, the CPICH1 is a pilot signal transmitted according to power required by all the terminals, within the coverage area, to perform both a channel state information CSI estimation and a channel estimation used for data demodulation, the CPICH2 is split into two pilot signals, that is, CPICH2s and CPICH2e, where the CPICH2s is a pilot signal transmitted according to power required by all terminals of a first category, within the coverage area, to perform a channel state information CSI estimation, and the CPICH2e is a pilot signal transmitted according to additional pilot transmit power required by all the terminals of the first category, within the coverage area, to perform a channel estimation used for data demodulation, and is a pilot signal transmitted within a corresponding TTI when a terminal of the first category is scheduled within the TTI; or, when the traditional terminal does not exist in the system, the CPICH1 and the CPICH2 are respectively split into two pilot signals, that is, CPICH1s and CPICH1e, and CPICH2s and CPICH2e, where the CPICH1s and the CPICH2s are pilot signals transmitted according to power required by all the terminals of the first category, within the coverage area, to perform a channel state information CSI estimation, and the CPICH1e and the CPICH2e are pilot signals transmitted according to additional pilot transmit power required by all the terminals of the first category, within the coverage area, to perform a channel estimation used for data demodulation, and are pilot signals transmitted within a corresponding TTI when a terminal of the first category is scheduled within the TTI.

S102: Transmit a pilot signal $CPICH_{k1}$ over a $k1^{th}$ antenna, where k1 is an integer greater than 2 and smaller than or equal to M.

S103: Upon determining that a terminal of the first category in the MIMO system is scheduled within a TTI, additionally transmit a pilot signal $CPICH_{k2}$ over the $k1^{th}$ antenna within the TTI, where k2=M−2+k1.

A value of M in S102 and S103 is determined according to the quantity of antennas of a base station in the MIMO system, for example, the value of M in a 4 Branch MIMO system is 4 and the value of M in an 8 Branch MIMO system is 8, and the rest may be deduced in analogy.

The CPICH is a Common Pilot Channel. In the present invention, a common pilot signal transmitted over a common pilot channel with number 1 is abbreviated as CPICH1, a common pilot signal transmitted over a common pilot channel with number 2 is abbreviated as CPICH2, a common pilot signal transmitted over a common pilot channel with number k1 is abbreviated as $CPICH_{k1}$, and a common pilot signal transmitted over a common pilot channel with number k2 is abbreviated as $CPICH_{k2}$.

The terminal of the first category is a reference terminal. In a 4 Branch MIMO system, the terminal of the first category may be a 4 Branch MIMO terminal, and in an 8 Branch MIMO system, the terminal of the first category may be an 8 Branch MIMO terminal (including an 8×8 MIMO terminal, an 8×4 MIMO terminal, an 8×2 MIMO terminal, an 8×1 MIMO terminal, or the like). In S103, by determining whether a terminal of the first category, within the coverage area of the base station, is scheduled within the TTI, whether to transmit a new pilot signal over another antenna except the first antenna and the second antenna is determined. Therefore, the new pilot signal is referred to as a scheduled common pilot signal in the embodiments of the present invention.

In S102, a pilot signal $CPICH_{k1}$ is transmitted over a $k1^{th}$ antenna, that is, an antenna except the first antenna and the second antenna, to ensure that a terminal of the first category, within the coverage area of the base station, performs a basic operation such as a CSI estimation; while in S103, a new pilot signal CPICH1 is transmitted over the $k1^{th}$ antenna only when a terminal of the first category in the MIMO system is scheduled within the TTI, so that the terminal of the first category, within the coverage area of the base station, may further meet a pilot requirement for a channel estimation used for data demodulation based on a fact that the terminal of the first category is capable of implementing an operation such as the CSI estimation.

Specifically, the $CPICH_{k1}$ may be a pilot signal transmitted over a $k1^{th}$ antenna according to power required by all the terminals of the first category, within the coverage area, to perform a CSI estimation; the CPICH1 is a new pilot signal additionally transmitted, within the TTI, over the $k1^{th}$ antenna only when a terminal of the first category is scheduled within a TTI, and a purpose of transmitting the $CPICH_{k1}$ and the $CPICH_{k2}$ is to ensure that channel estimation results of all the terminals of the first category, within the coverage area, meet a requirement for performing data demodulation, by combining the two pilot signals, that is, the $CPICH_{k1}$ and the $CPICH_{k2}$ over the $k1^{th}$ antenna.

It should be noted that, the $CPICH_{k1}$ and the $CPICH_{k2}$ transmitted over the $k1^{th}$ antenna may be transmitted over different code channels or may also be transmitted over a same code channel In the embodiment of the present invention, when a 4 Branch MIMO terminal or an 8 Branch MIMO terminal is not scheduled within a TTI, a $CPICH_{k2}$ is not transmitted within the TTI. In this way, the present invention effectively reduces interference to a traditional terminal while being compatible with the traditional terminal in the MIMO system, especially when the terminal of the first category such as the 4 Branch MIMO terminal in a 4 Branch MIMO system, the 8 Branch MIMO terminal in the 8 Branch MIMO system, or the like is not scheduled, interference to the traditional terminal is the lowest. The present invention ensures performance of the traditional terminal while ensuring that the terminal of the first category properly works in the MIMO system, and effectively reduces power consumption for transmitting a pilot signal.

Figure 2:
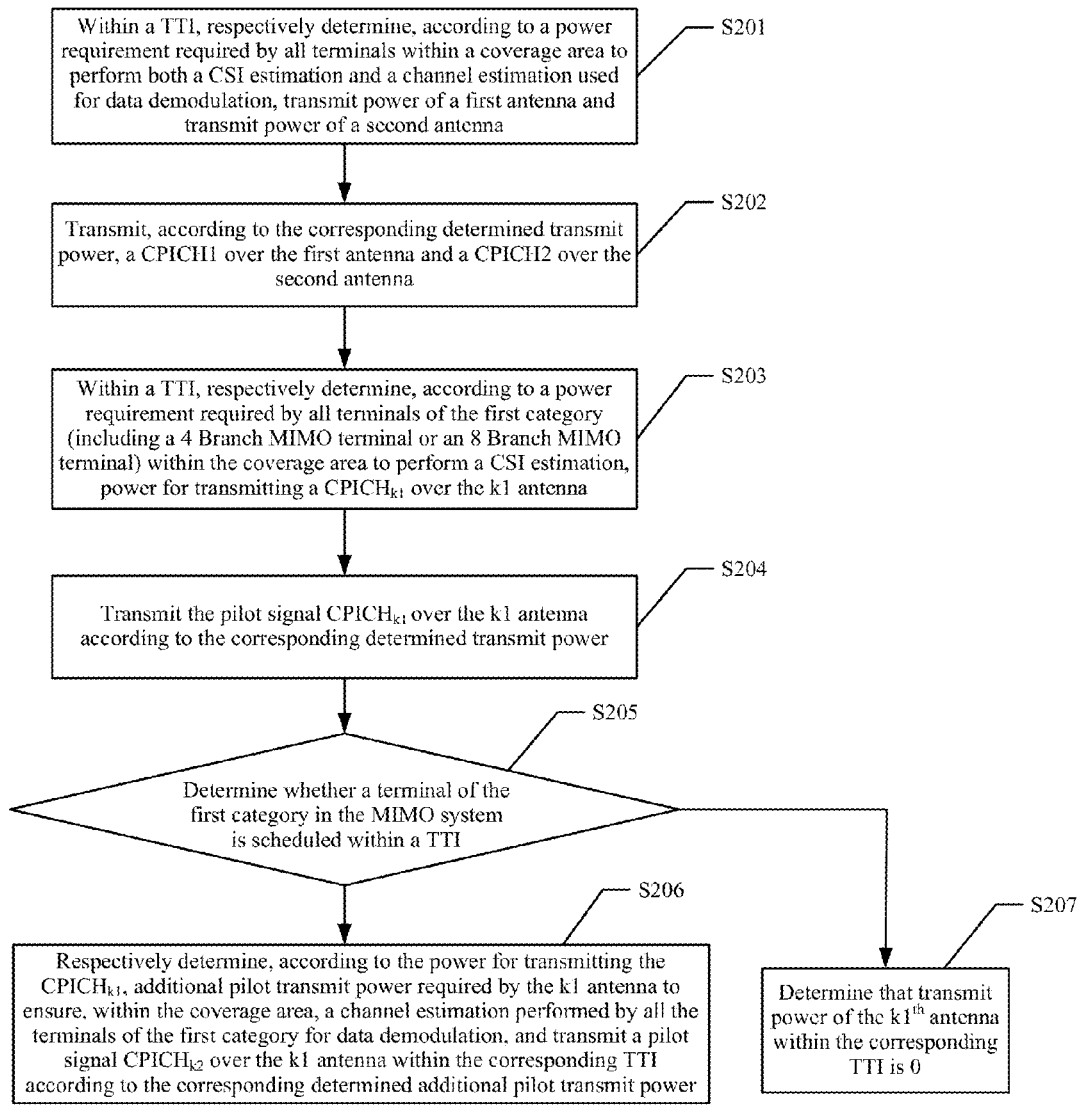
FIG. 2 is a schematic flowchart of a pilot signal transmission method according to a second embodiment.

Further referring to FIG. 2, FIG. 2 is a flowchart of a pilot signal transmission method according to a second embodiment of the present invention. Specifically, the method according to this embodiment includes:

S201: Within a TTI, respectively determine, according to a power required by all terminals within a coverage area to perform both a CSI estimation and a channel estimation used for data demodulation, transmit power of a first antenna and transmit power of a second antenna.

S202: Transmit a CPICH1 over the first antenna and a CPICH2 over the second antenna according to the corresponding determined transmit power.

Specifically, S201 and S202 correspond to S101 of the foregoing method according to the first embodiment. That is, in S201, it is determined according to a power required by all terminals, within a coverage area of a base station to perform both a channel state information CSI estimation and a channel estimation used for data demodulation, that power for transmitting the CPICH1 over the first antenna and power for transmitting the CPICH2 over the second antenna are transmitted in S202.

The transmit power for transmitting the CPICH1 over the first antenna and the transmit power for transmitting the CPICH2 over the second antenna, determined in S201, may be the same or may be different. The base station may configure the transmit power according to an actual situation or may adjust the transmit power according to a working situation of a traditional terminal within the coverage area of the base station.

In addition, transmit time in S201, that is, a TTI within which a signal is transmitted, may be specified as required, that is, within all TTIs or within a TTI; the transmit power may be adjusted according to a terminal usage situation within the coverage area of the base station, which is not specifically limited to the power required by all terminals to perform both the channel state information CSI estimation and the channel estimation used for data demodulation.

S203: Within the TTI, respectively determine, according to a power required by all terminals of the first category (including a 4 Branch MIMO terminal or an 8 Branch MIMO terminal) within the coverage area to perform a CSI estimation, power for transmitting a $CPICH_{k1}$ over the $k1^{th}$ antenna;

S204: Transmit the pilot signal $CPICH_{k1}$ over the $k1^{th}$ antenna according to the corresponding determined transmit power.

Specifically, S203 and S204 correspond to S102 of the foregoing method according to the embodiment, that is, in S203, within all TTIs, the transmit power for transmitting the $CPICH_{k1}$ over the $k1^{th}$ antenna is determined according to a power required by all the terminals of the first category (including a 4 Branch MIMO terminal or an 8 Branch MIMO terminal) within the coverage area of the base station, and the $CPICH_{k1}$ is transmitted in S204.

As mentioned above, the transmit time and the power in S203 may be adjusted as required, which is not limited to content disclosed in this embodiment.

S205: Determine whether a terminal of the first category in the MIMO system is scheduled within the TTI.

If the determination result in S205 is positive, S206 is performed; otherwise, S207 is performed.

S206: Respectively determine, according to the power for transmitting the $CPICH_{k1}$, additional pilot transmit power required by the $k1^{th}$ antenna to ensure, within the coverage area, a channel estimation performed by all the terminals of the first category for data demodulation, and transmit a pilot signal $CPICH_{k2}$ over the $k1^{th}$ antenna within the TTI according to the corresponding determined additional pilot transmit power.

S207: Determine that transmit power of the $k1^{th}$ antenna within the TTI is 0.

The terminal of the first category is a reference terminal. If the MIMO system is a 4 Branch MIMO system, the terminal of the first category may be a 4 Branch MIMO terminal, and if the MIMO system is an 8 Branch MIMO system, the terminal of the first category may be an 8 Branch MIMO terminal.

In actual implementation, because a terminal relies on a base station that covers an area where the terminal is located, the base station may determine, in S205, whether a terminal of the first category is scheduled within a coverage area of the base station. When it is determined that a terminal of the first category is scheduled, S206 is performed; otherwise, S207 is performed.

Specifically, S205 to S207 correspond to S103 of the foregoing method according to the first embodiment, that is, whether the CPICH1 is transmitted is determined according to whether a terminal of the first category is scheduled within a TTI in the MIMO system, and when a terminal of the first category in the MIMO system is scheduled within the TTI, additional pilot transmit power required by the $k1^{th}$ antenna to ensure, within the coverage area, a channel estimation performed by all the terminals of the first category for data demodulation is respectively determined according to the power for transmitting the $CPICH_{k1}$, and the additional pilot transmit power is used as power for transmitting the $CPICH_{k2}$ over the $k1^{th}$ antenna within the TTI, and when no terminal of the first category is scheduled, it is determined that the power for transmitting the $CPICH_{k2}$ within the TTI is 0, that is, not transmitting the $CPICH_{k2}$.

As mentioned above, the transmit time and the power in S206 may be adjusted as required, which is not limited to content disclosed in this embodiment.

Figure 3:
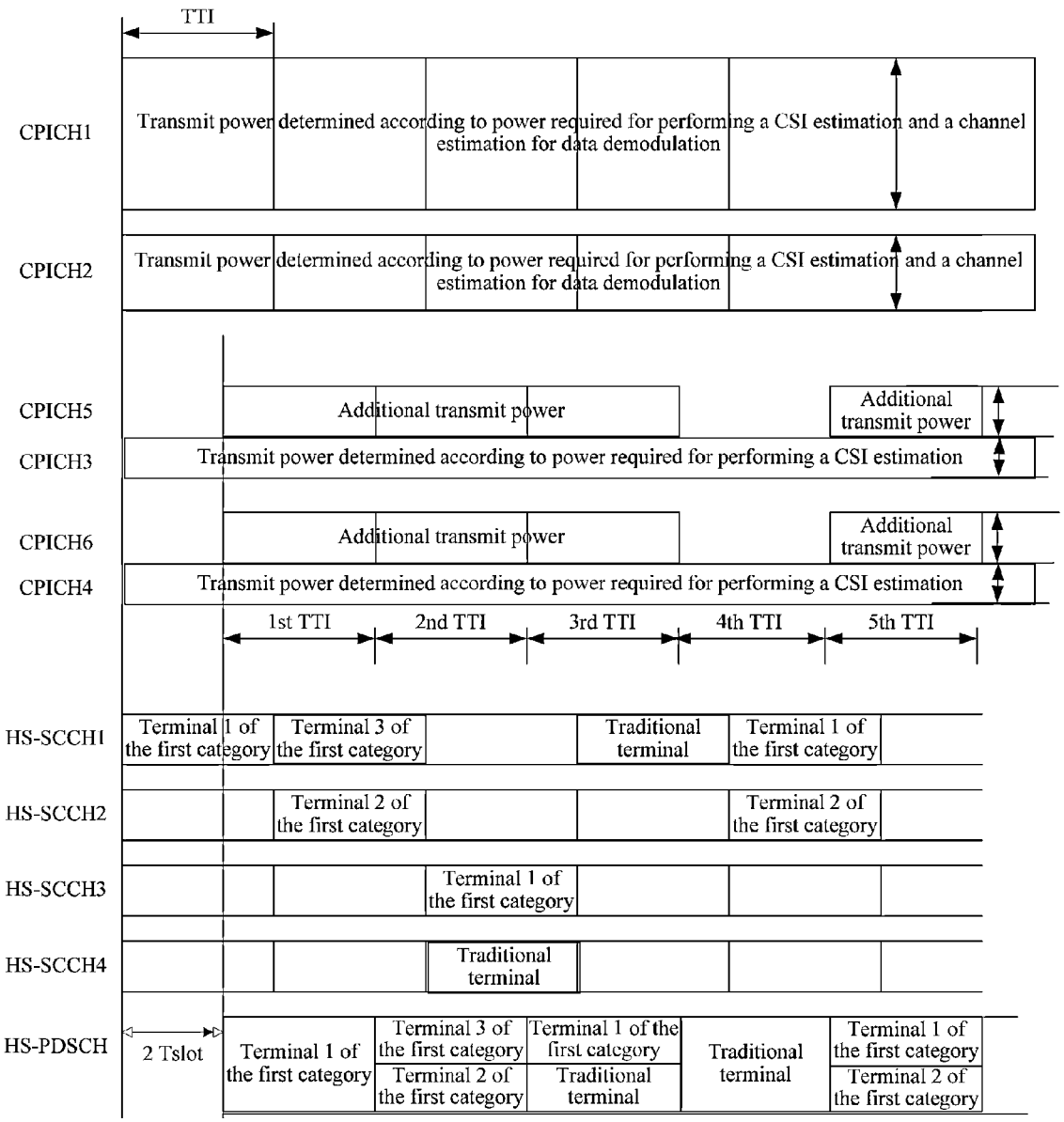
FIG. 3 is a schematic diagram of a time sequence of a pilot signal transmitted over each antenna in a 4 Branch MIMO system.

It should be noted that, the transmitted CPICH1, CPICH2, and $CPICH_{k1}$ are continuously transmitted the whole time within all the TTIs according to this embodiment, where time sequence boundaries of the CPICH1, CPICH2, and CPICH$_{k1}$ are aligned with a time sequence boundary of a Primary Common Control Physical Channel (P-CCPCH); and a time sequence boundary of the transmitted CPICH$_{k2}$ is aligned with a time sequence boundary of a High Speed Physical Shared Channel (HS-PDSCH), that is, two time slots later than the P-CCPCH, and the CPICH$_{k2}$ is transmitted only within a TTI within which a terminal of the first category is scheduled. Specifically, referring to FIG. 3, FIG. 3 is a schematic diagram of a time sequence of a pilot signal transmitted over each antenna in a 4 Branch MIMO system.

It should be further noted that, the time sequence boundary of the CPICH$_{k2}$ transmitted in S206 is aligned with the time sequence boundary of the high speed physical shared channel HS-PDSCH channel, or as another implementation manner, the time sequence boundary of the CPICH$_{k2}$ is on a basis of the time sequence boundary of the high speed physical shared channel HS-PDSCH, that is, transmitting starts several symbol time ahead of the TTI within which a terminal of the first category is scheduled, the transmission continues several symbol time after the TTI within which a terminal of the first category is scheduled, and lengths of the symbol time ahead of and later than the TTI are pre-assigned by a system. An advantage of this manner is that a channel estimation effect of a terminal located at the boundary of a TTI within which a terminal of the first category is scheduled may be optimized The embodiment of the present invention effectively reduces interference to a traditional terminal while being compatible with the traditional terminal in a MIMO system, especially when a terminal of the first category such as the 4 Branch MIMO terminal in a 4 Branch MIMO system, the 8 Branch MIMO terminal in the 8 Branch MIMO system, or the like is not scheduled, interference to a traditional terminal is the lowest. The present invention ensures performance of the traditional terminal while ensuring that the terminal of the first category properly works in the MIMO system, and effectively reduces power consumption for transmitting a pilot signal.

Figure 4:
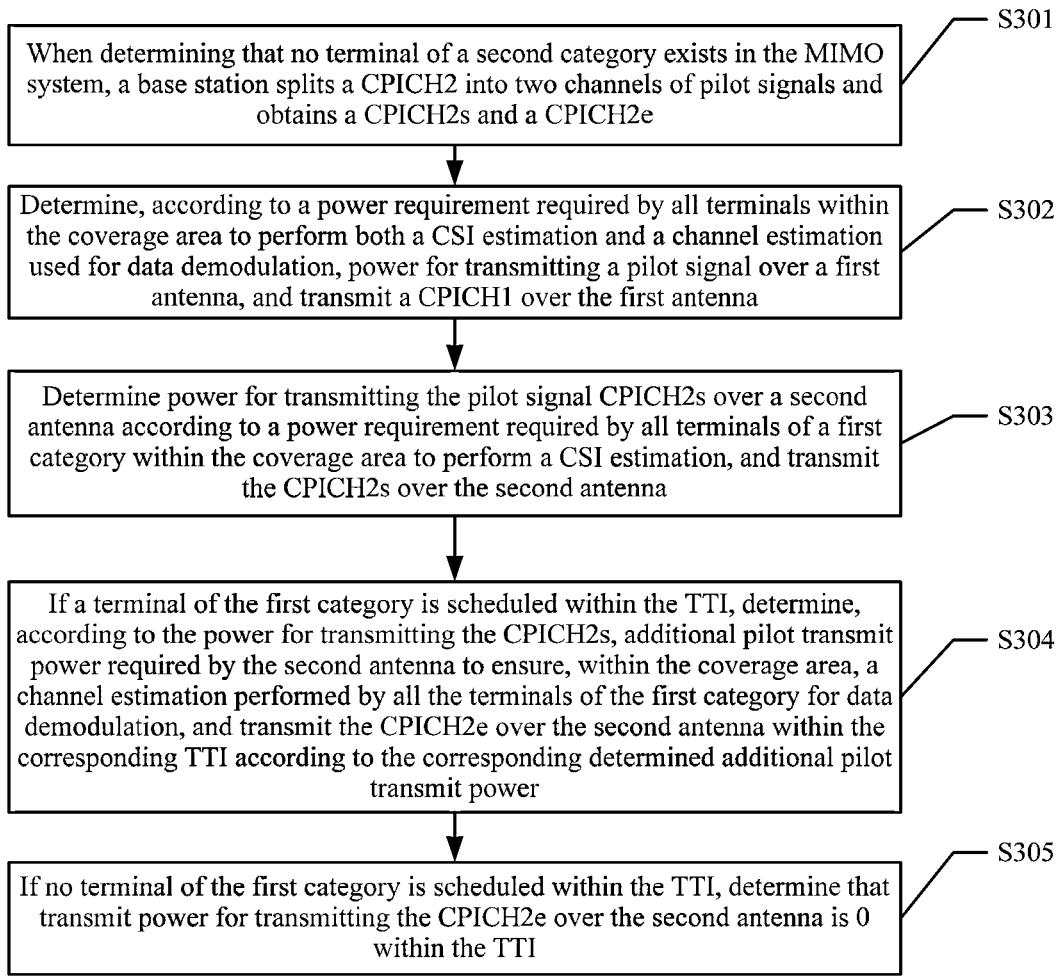
FIG. 4 is a schematic flowchart of pilot signal transmission according to an embodiment.

Further referring to FIG. 4, FIG. 4 is a flowchart of pilot signal transmission according to another embodiment of the present invention. Steps for transmitting pilot signals in this embodiment correspond to S101 of the foregoing method according to the first embodiment. Specifically, the steps for transmitting the pilot signals in this embodiment include:

S301: In a MIMO system, when determining that no terminal of a second category exists within a coverage area, a base station splits a CPICH2 into two channels of pilot signals and obtains a CPICH2s and a CPICH2e.

S302: Determine, according to a power required by all terminals within the coverage area to perform both a CSI estimation and a channel estimation used for data demodulation, power for transmitting a pilot signal over a first antenna, and transmit a CPICH1 over the first antenna.

S303: Determine power for transmitting the pilot signal CPICH2s over a second antenna according to a power required by all terminals of a first category within the coverage area to perform a CSI estimation, and transmit the CPICH2s over the second antenna.

S304: If a terminal of the first category is scheduled within a TTI, determine, according to the power for transmitting the CPICH2s, additional pilot transmit power required by the second antenna to ensure, within the coverage area, a channel estimation performed by all the terminals of the first category for data demodulation, and transmit the CPICH2e over the second antenna within the TTI according to the corresponding determined additional pilot transmit power.

S305: If no terminal of the first category is scheduled within the TTI, determine that transmit power for transmitting the CPICH2e over the second antenna is 0 within the TTI.

The terminal of the first category is a 4 Branch MIMO terminal in a 4 Branch MIMO system or an 8 Branch MIMO terminal in an 8 Branch MIMO system, and the terminal of the second category includes a 2×1 MIMO terminal or a 2×2 MIMO terminal in the MIMO system.

In this embodiment, when no 2×1 MIMO terminal or 2×2 MIMO terminal exists, a pilot signal CPICH2 is split into two channels of pilot signals to obtain a CPICH2s and a CPICH2e that may be transmitted over two different code channels. The CPICH2s is transmitted over the second antenna according to power required by all the terminals of the first category, within the coverage area, to perform a channel estimation for CSI estimation. Meanwhile, the new pilot signal CPICH2e is additionally transmitted over the second antenna only when a terminal of the first category is scheduled, and its purpose is to ensure that channel estimation results of all the terminals of the first category, within the coverage area, meet a requirement for performing data demodulation, by combining the two pilot signals, that is, the CPICH2s and the CPICH2e over the second antenna. While ensuring that a terminal within the coverage area performs a channel estimation, this embodiment may further deduce interference to a traditional terminal in the system and reduce power consumption for transmitting a pilot signal.

Figure 5:
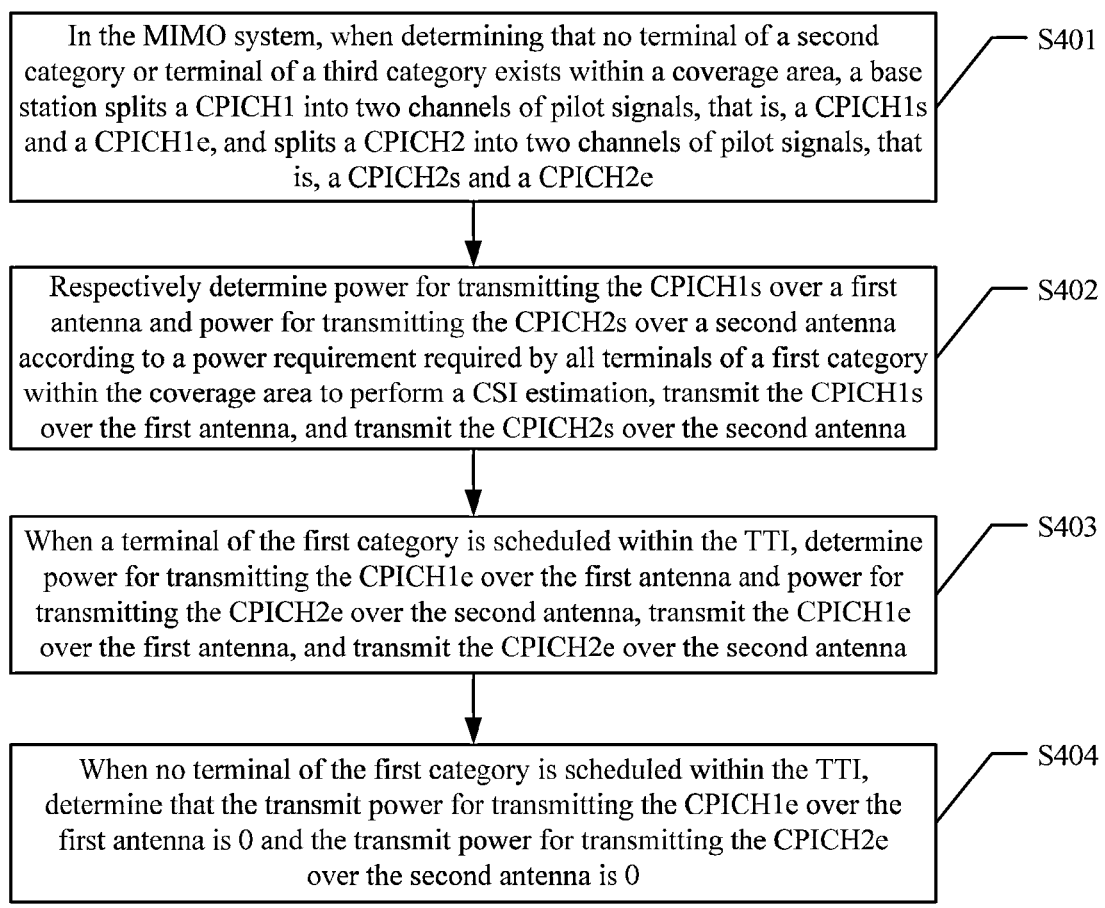
FIG. 5 is a schematic flowchart of pilot signal transmission according to another embodiment.

Further referring to FIG. 5, FIG. 5 is a flowchart of pilot signal transmission according to another embodiment of the present invention. Steps for transmitting pilot signals in this embodiment correspond to S101 of the foregoing method according to the first embodiment. Specifically, the steps for transmitting the pilot signals in this embodiment include:

S401: In a MIMO system, when determining that no terminal of a second category or terminal of a third category exists within a coverage area, a base station splits a CPICH1 into two channels of pilot signals, that is, a CPICH1s and a CPICH1e, and splits a CPICH2 into two channels of pilot signals, that is, a CPICH2s and a CPICH2e.

S402: Respectively determine power for transmitting the CPICH1s over a first antenna and power for transmitting the CPICH2s over a second antenna according to a power required by all terminals of a first category within the coverage area to perform a CSI estimation, transmit the CPICH1s over the first antenna, and transmit the CPICH2s over the second antenna.

S403: When a terminal of the first category is scheduled within a TTI, determine power for transmitting the CPICH1e over the first antenna and power for transmitting the CPICH2e over the second antenna, transmit the CPICH1e over the first antenna, and transmit the CPICH2e over the second antenna.

Specifically, additional pilot transmit power required by the first antenna to ensure, within the coverage area, a channel estimation performed by all the terminals of the first category for data demodulation is determined according to the power for transmitting the CPICH1s, and the CPICH1e is transmitted over the first antenna within the TTI according to the corresponding determined additional pilot transmit power, and additional pilot transmit power required by the second antenna to ensure, within the coverage area, a channel estimation performed by all the terminals of the first category for data demodulation is determined according to the power for transmitting the CPICH2s, and the CPICH2e is transmitted over the second antenna within the TTI according to the corresponding determined additional pilot transmit power.

S404: When no terminal of the first category is scheduled within the TTI, determine that the transmit power for transmitting the CPICH1e over the first antenna is 0 and the transmit power for transmitting the CPICH2e over the second antenna is 0.

The terminal of the first category is a 4 Branch MIMO terminal in a 4 Branch MIMO system or an 8 Branch MIMO terminal in an 8 Branch MIMO system, the terminal of the second category includes a 2×1 MIMO terminal or a 2×2 MIMO terminal in the MIMO system, and the terminal of the third category includes any type of single-output single-input terminals and single-output double-input terminals.

In this embodiment, when no 2×1 MIMO terminal, 2×2 MIMO terminal, SISO terminal, or single-output double-input terminal exists, a CPICH1 is split into two channels of pilot signals, that is, a CPICH1s and a CPICH1e, and a CPICH2 is split into two channels of pilot signals, that is, a CPICH2s and a CPICH2e. The CPICH1s and the CPICH1e may be transmitted over two different code channels, and similarly, the CPICH2s and the CPICH2e may also be transmitted over two different code channels Within all TTIs, the CPICH1s and the CPICH2s are transmitted, according to transmit power respectively determined by a power required by all the terminals of the first category within the coverage area to perform a CSI estimation. The new pilot signals CPICH1e and CPICH2e are additionally transmitted over the first and the second antennas only when a terminal of the first category is scheduled, and its purpose is to ensure that channel estimation results of all the terminals of the first category, within the coverage area, meet a requirement for performing data demodulation, by combining the CPICH1s and the CPICH1e over the first antenna and combining the CPICH2s and the CPICH2e over the second antenna. While ensuring that a terminal within the coverage area performs a channel estimation, this embodiment may further reduce power consumption for transmitting a pilot signal.

Figure 6:
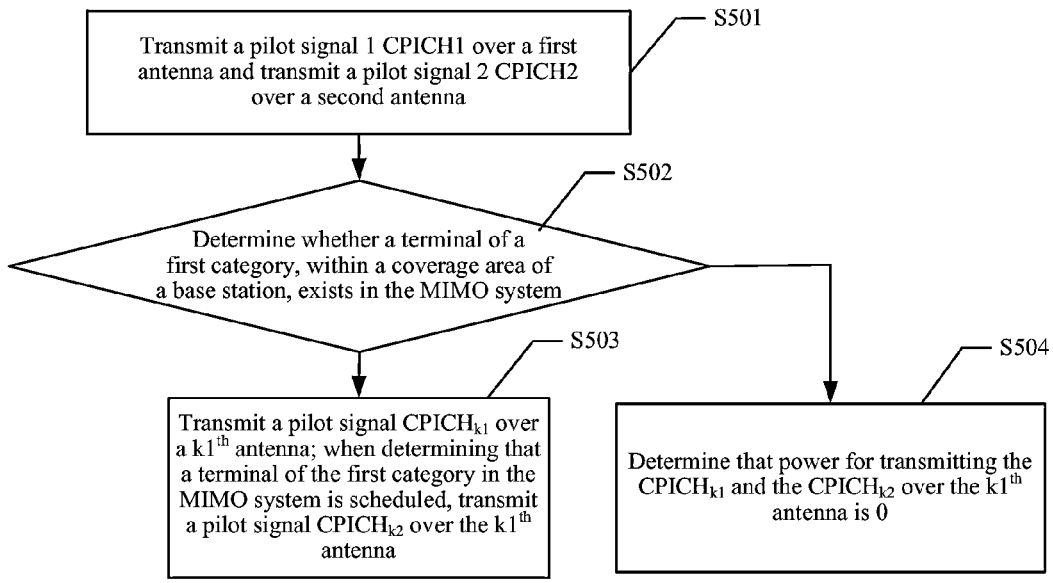
FIG. 6 is a schematic flowchart of a pilot signal transmission method according to a third embodiment.

Further referring to FIG. 6, FIG. 6 is a flowchart of a pilot signal transmission method according to a fourth embodiment of the present invention. Specifically, the method according to this embodiment includes:

S501: Transmit a pilot signal 1 CPICH1 over a first antenna and transmit a pilot signal 2 CPICH2 over a second antenna.

S502: Determine whether a terminal of a first category, within a coverage area of a base station, exists in a MIMO system, where the terminal of the first category includes: a 4 Branch MIMO terminal in a 4 Branch MIMO system, including a 4×4 MIMO terminal, a 4×2 MIMO terminal, a 4×1 MIMO terminal, or the like; or an 8 Branch MIMO terminal in an 8 Branch MIMO system, including an 8×8 MIMO terminal, an 8×4 MIMO terminal, an 8×2 MIMO terminal, or an 8×1 MIMO terminal.

When a determination result indicates that a terminal of the first category exists, S503 is performed; otherwise, S504 is performed.

S503: Transmit a pilot signal $CPICH_{k1}$ over a $k1^{th}$ antenna; when determining that a terminal of the first category in the MIMO system is scheduled, transmit a pilot signal $CPICH_{k2}$ over the $k1^{th}$ antenna, where k1 is an integer greater than 2 and smaller or equal to M, and k2=M−2+k1.

S504: Determine that power for transmitting the $CPICH_{k1}$ and the $CPICH_{k2}$ over the $k1^{th}$ antenna is 0, that is, not transmitting the $CPICH_{k1}$ and the CPICH1.

That is, when determining that no terminal of the first category exists within the coverage area in the MIMO system, the base station only respectively transmits the CPICH1 and the CPICH2 over the first antenna and the second antenna, rather than transmit the $CPICH_{k1}$ and the $CPICH_{k2}$ over the $k1^{th}$ antenna. In this way, interference to a traditional terminal in the MIMO system is reduced, especially when it is determined that no terminal of the first category is scheduled, basically no interference is caused to the traditional terminal, and power for transmitting a pilot signal by the base station is reduced to a maximum extent to reduce power consumption.

Figure 7:
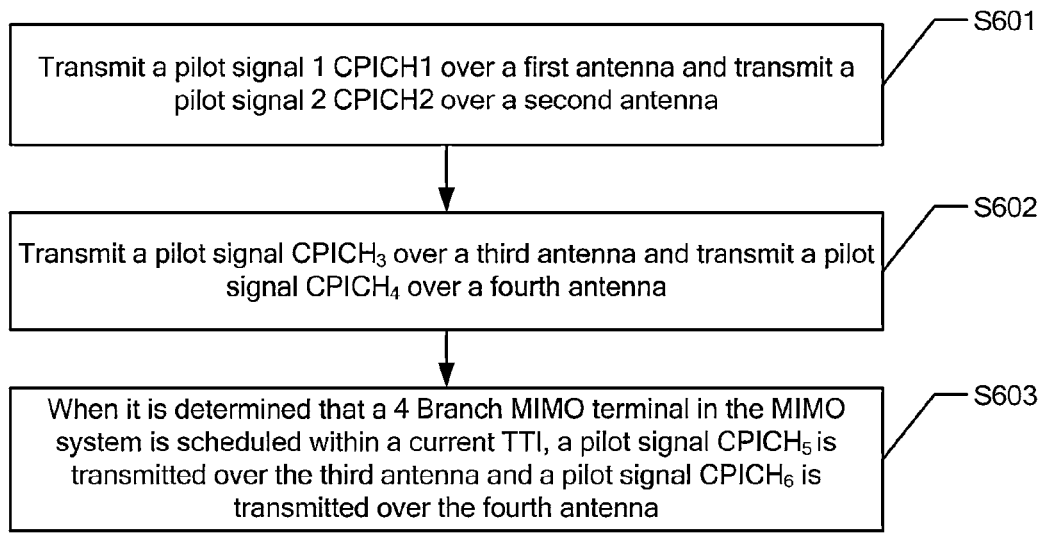
FIG. 7 is a schematic flowchart of a pilot signal transmission method according to a fourth embodiment.

Further referring to FIG. 7, FIG. 7 is a flowchart of a pilot signal transmission method according to a fourth embodiment of the present invention. The pilot signal transmission method according to this embodiment is applicable to a 4 Branch MIMO system, and the method specifically includes:

S601: Transmit a pilot signal 1 CPICH1 over a first antenna and transmit a pilot signal 2 CPICH2 over a second antenna.

Specifically, within all TTIs, transmit power of the first antenna and transmit power of the second antenna are respectively determined according to a power required by all terminals within a coverage area to perform both a CSI estimation and a channel estimation used for data demodulation, and then the CPICH1 is transmitted over the first antenna and the CPICH2 is transmitted over the second antenna according to the corresponding determined transmit power.

S602: Transmit a pilot signal $CPICH_3$ over a third antenna and transmit a pilot signal $CPICH_4$ over a fourth antenna.

Specifically, within all TTIs, power for transmitting the pilot signal CPICH3 over the third antenna and that of the pilot signal CPICH4 over the fourth antenna are determined according to all 4 Branch MIMO terminals within the coverage area, and the CPICH3 is transmitted over the third antenna and the pilot signal CPICH4 is transmitted over the fourth antenna according to the corresponding determined transmit power.

S603: When it is determined that a 4 Branch MIMO terminal in the MIMO system is scheduled within a TTI, a pilot signal $CPICH_5$ is transmitted over the third antenna and a pilot signal $CPICH_6$ is transmitted over the fourth antenna.

Specifically, whether a 4 Branch MIMO terminal in the 4 Branch MIMO system is scheduled within the TTI is determined first.

If a 4 Branch MIMO terminal in the 4 Branch MIMO system is scheduled within the TTI, additional pilot transmit power required by the third antenna to ensure, within the coverage area, a channel estimation performed by all 4 Branch MIMO terminals for data demodulation is determined according to the power for transmitting the CPICH3, and the CPICH5 is additionally transmitted over the third antenna within the TTI according to the corresponding determined additional pilot transmit power, and additional pilot transmit power required by the fourth antenna to ensure, within the coverage area, a channel estimation performed by all 4 Branch MIMO terminals for data demodulation is determined according to the power for transmitting the $CPICH_4$, and a $CPICH_6$ is additionally transmitted over the fourth antenna within the TTI according to the corresponding determined additional pilot transmit power.

If no 4 Branch MIMO terminal in the 4 Branch MIMO system is scheduled within the TTI, it is determined that power for transmitting the CPICH5 over the third antenna and that of the CPICH6 over the fourth antenna are 0 within the TTI, that is, the CPICH5 is not additionally transmitted over the third antenna and the pilot signal CPICH6 is not additionally transmitted over the fourth antenna.

In the 8 Branch MIMO system, steps for implementing the corresponding pilot signal transmission method are basically the same as those in the 4 Branch MIMO system. In the 8 Branch MIMO system, a base station may determine, according to whether a terminal of the first category, that is, an 8 Branch MIMO terminal is scheduled, whether to additionally transmit new pilot signals over the third to eighth antennas.

The embodiment of the present invention effectively reduce interference to a traditional terminal while being compatible with the traditional terminal in the 4 Branch MIMO system, especially when the 4 Branch MIMO terminal is not scheduled, interference to the traditional terminal is the lowest. The present invention ensures performance of the traditional while ensuring that the 4 Branch MIMO terminal properly works in the 4 Branch MIMO system, and effectively reduces power consumption for transmitting a pilot signal.

Figure 8:
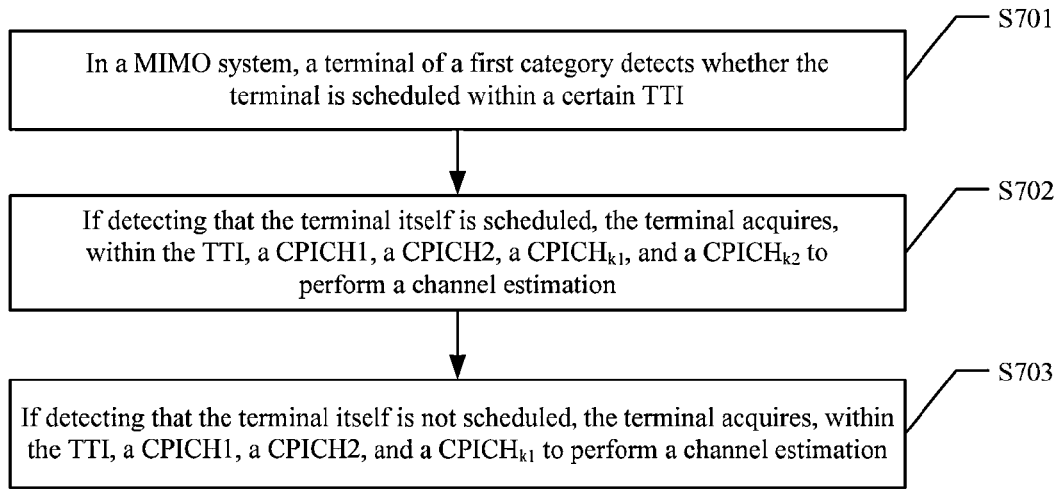
FIG. 8 is a schematic flowchart of a channel estimation method in a MIMO system.

Further referring to FIG. 8, FIG. 8 is a flowchart of a channel estimation method in a MIMO system according to the present invention. The channel estimation method according to this embodiment specifically includes:

S701: In a MIMO system, a terminal of a first category detects whether the terminal is scheduled within a TTI.

Specifically, the terminal of the first category in this embodiment is a defined reference terminal in the MIMO system. In a 4 Branch MIMO system, the terminal of the first category is a 4 Branch MIMO terminal, and in an 8 Branch MIMO system, the terminal of the first category is an 8 Branch MIMO terminal.

S702: If detecting that the terminal is scheduled, the terminal acquires, within the TTI, a CPICH1, a CPICH2, a $CPICH_{k1}$, and a $CPICH_{k2}$ to perform a channel estimation.

S703: If detecting that the terminal is not scheduled, the terminal acquires, within the TTI, a CPICH1, a CPICH2, and a $CPICH_{k1}$ to perform a channel estimation.

The CPICH1 and the CPICH2 are pilot signals transmitted over a first antenna and a second antenna on a base station side, the $CPICH_{k1}$ is a pilot signal transmitted over a $k1^{th}$ antenna on the base station side, the $CPICH_{k2}$ is a pilot signal transmitted over the $k1^{th}$ antenna when it is determined that a terminal of the first category in the MIMO system is scheduled on the base station side within the TTI, where k1 is an integer greater than 2 and smaller than or equal to M, and k2=M−2+k1.

Specifically, for the CPICH1 and the CPICH2, the base station first respectively determines, according to a power required by all terminals within a coverage area to perform both a CSI estimation and a channel estimation used for data demodulation, transmit power of the first antenna and transmit power of the second antenna, and transmits the CPICH1 over the first antenna and transmits the CPICH2 over the second antenna;

For the $CPICH_{k1}$, the base station respectively determines, according to a power required by all terminals of the first category, within the coverage area, to perform a CSI estimation, power for transmitting the $CPICH_{k1}$ over the $k1^{th}$ antenna, and respectively transmits the $CPICH_{k1}$ over the $k1^{th}$ antenna according to the corresponding transmit power; for the $CPICH_{k2}$, the base station may choose to transmit or not transmit the $CPICH_{k2}$ within the TTI according to a situation of scheduling a terminal of the first category within each TTI. If a terminal of the first category is scheduled within a TTI, the base station respectively determines, according to the power for transmitting the $CPICH_{k1}$ within the TTI, additional pilot transmit power required by the $k1^{th}$ antenna to ensure, within the coverage area, a channel estimation performed by all the terminals of the first category for data demodulation, and transmits the pilot signal $CPICH_{k2}$ over the $k1^{th}$ antenna; if no terminal of the first category is scheduled within a TTI, the base station determines that power for transmitting the $CPICH_{k2}$ within the TTI is 0, that is, not transmitting the $CPICH_{k2}$.

Therefore, when the terminal of the first category detects that it is scheduled, the terminal of the first category may obtain, based on S702, a channel estimation result that may be used for a CSI estimation and data demodulation, and meanwhile may be used for a channel estimation optimization in a subsequent TTI, for example, channel smooth filtering. When the terminal of the first category detects that it is not scheduled, the terminal of the first category may obtain, based on S703, a channel estimation result that meets a CSI estimation requirement and may also be used for a channel estimation optimization in a subsequent TTI, for example, channel smooth filtering.

In the embodiment of the present invention, the terminal of the first category in the MIMO system is the 4 Branch MIMO terminal in the 4 Branch MIMO system and the 8 Branch MIMO terminal in the 8 Branch MIMO system. A signal estimation and a channel estimation optimization in a subsequent TTI are properly performed according to a pilot signal transmitted over each antenna of the base station.

Figure 9:
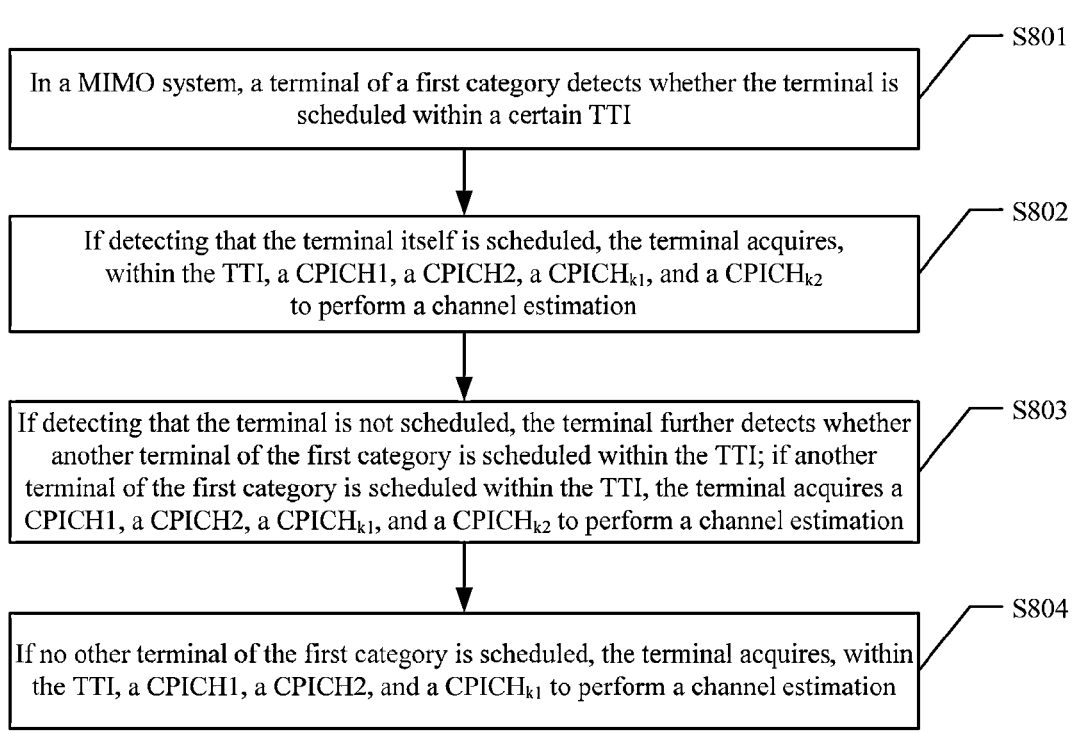
FIG. 9 is a schematic flowchart of another channel estimation method in a MIMO system.

Further referring to FIG. 9, FIG. 9 is a flowchart of a channel estimation method in another MIMO system according to the present invention. The channel estimation method according to this embodiment specifically includes:

S801: In a MIMO system, a terminal of a first category detects whether the terminal is scheduled within a TTI.

Specifically, the terminal of the first category in this embodiment is a defined reference terminal in the MIMO system. In a 4 Branch MIMO system, the terminal of the first category may be a 4 Branch MIMO terminal, and in an 8 Branch MIMO system, the terminal of the first category may be an 8 Branch MIMO terminal.

S802: If detecting that the terminal is scheduled, the terminal acquires, within the TTI, a CPICH1, a CPICH2, a $CPICH_{k1}$, and a $CPICH_{k2}$ to perform a channel estimation.

S803: If detecting that the terminal is not scheduled, the terminal further detects whether another terminal of the first category is scheduled within the TTI; if another terminal of the first category is scheduled within the TTI, the terminal acquires a CPICH1, a CPICH2, a $CPICH_{k1}$, and a $CPICH_{k2}$ to perform a channel estimation.

S804: If no other terminal of the first category is scheduled, the terminal acquires, within the TTI, a CPICH1, a CPICH2, and a $CPICH_{k1}$ to perform a channel estimation.

The CPICH1 and the CPICH2 are pilot signals transmitted over a first antenna and a second antenna on a base station side, the $CPICH_{k1}$ is a pilot signal transmitted over a $k1^{th}$ antenna on the base station side, the $CPICH_{k2}$ is a pilot signal transmitted over the $k1^{th}$ antenna when it is determined that a terminal of the first category in the MIMO system is scheduled on the base station side within the TTI, where k1 is an integer greater than 2 and smaller than or equal to M, and k2=M−2+k1.

Specifically, for the CPICH1 and the CPICH2, the base station respectively determines, according to a power required by all terminals within a coverage area to perform both a CSI estimation and a channel estimation used for data demodulation, transmit power of the first antenna and transmit power of the second antenna, and transmits the CPICH1 over the first antenna and transmits the CPICH2 over the second antenna.

For the $CPICH_{k1}$, the base station respectively determines, according to a power required by all terminals of the first category, within the coverage area, to perform a CSI estimation, power for transmitting the $CPICH_{k1}$ over the k1$^{th}$ antenna, and transmits the $CPICH_{k1}$ over the k1$^{th}$ antenna according to the corresponding transmit power; for the $CPICH_{k2}$, the base station may choose to transmit or not transmit the $CPICH_{k2}$ within the TTI, according to a situation of scheduling a terminal of the first category within each TTI. If a terminal of the first category is scheduled within a TTI, the base station respectively determines, according to power for transmitting the $CPICH_{k1}$ within the TTI, additional pilot transmit power required by the k1$^{th}$ antenna to ensure, within the coverage area, a channel estimation performed by all the terminals of the first category for data demodulation, and transmits the pilot signal CPICH1 over the k1$^{th}$ antenna; if no terminal of the first category is scheduled within a TTI, the base station determines that power for transmitting the $CPICH_{k2}$ within the TTI is 0, that is, not transmitting the $CPICH_{k2}$.

Therefore, when the terminal of the first category detects that it is scheduled or another terminal of the first category is scheduled, the terminal of the first category acquires, based on S802 and S803, a channel estimation result, where the channel estimation result meets a requirement for performing both a CSI estimation and data demodulation, and meanwhile may be used for a channel estimation optimization in a subsequent TTI, for example, channel smooth filtering. Based on S804, a channel estimation result that meets a requirement for a CSI estimation and meanwhile may be used for a channel estimation optimization in a subsequent TTI, for example, channel smooth filtering, may be acquired.

In S801, the detecting by the terminal of the first category whether it is scheduled within a TTI is performed by the terminal according to whether an identification of the terminal is used for masking over an HS-SCCH channel within the TTI.

In S803 and S804, the further detecting whether another terminal of the first category is scheduled within the TTI is performed by the terminal according to whether energy is transmitted over a code channel where the $CPICH_{k2}$ resides within the TTI.

In the embodiment of the present invention, the terminal of the first category in the MIMO system is the 4 Branch MIMO terminal in the 4 Branch MIMO system and the 8 Branch MIMO terminal in the 8 Branch MIMO system. When a terminal is scheduled or is not scheduled, a signal estimation and a channel estimation optimization in a subsequent TTI are properly performed according to a pilot signal transmitted over each antenna of the base station.

In Embodiment 6 for the channel estimation method in the MIMO system corresponding to FIG. 8 and Embodiment 7 for another channel estimation method in the MIMO system corresponding to FIG. 9, differences between the two channel estimation methods in the MIMO system are: the channel estimation method in Embodiment 6 does not require the terminal to detect whether another terminal of the first category is scheduled within the TTI, which saves detection overhead of the terminal, but a channel estimation result of this method is poorer compared with that of the method according to Embodiment 7. Therefore, the method according to Embodiment 6 is applicable to a terminal of the first category that does not have a high channel estimation requirement. The channel estimation method according to Embodiment 7 requires that the terminal detects whether another terminal of the first category is scheduled within each TTI, which increases detection overhead of the terminal, but a channel estimation result of this method is better compared with that of the method according to Embodiment 6. Therefore, the method according to Embodiment 7 is applicable to a terminal of the first category that has a high channel estimation requirement. In actual deployment, a terminal may select different channel estimation methods according to its requirements.

The following is a detailed description of a system and an apparatus according to the present invention.

Figure 10:
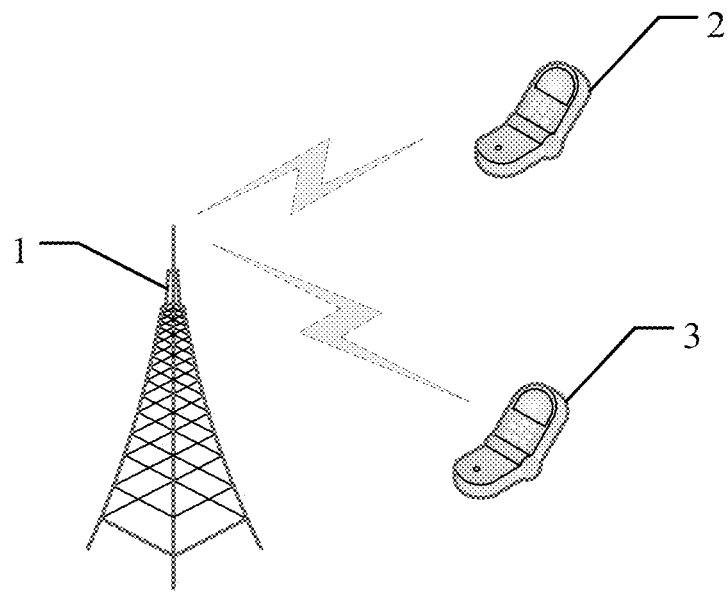
FIG. 10 is a schematic structural diagram of a MIMO system according to an embodiment.

Referring to FIG. 10, FIG. 10 is a schematic structural diagram of a MIMO system according to an embodiment of the present invention. The system in this embodiment is applicable to a 4 Branch MIMO system, an 8 Branch MIMO system, and the like, where the system specifically includes a base station 1 and multiple mobile terminals within a coverage area of the base station 1, and the base station 1 includes a pilot signal transmission control apparatus and an antenna. This embodiment describes in detail a MIMO terminal 2 and a MIMO terminal 3 among the multiple mobile terminals.

In this embodiment, the pilot signal transmission control apparatus of the base station 1 respectively controls, according to a corresponding strategy, a corresponding antenna of the base station to transit a pilot signal, so that all the terminals including the MIMO terminal 2 and the MIMO terminal 3 may properly perform a channel estimation. In the 4 Branch MIMO system, the base station 1 may include four antennas; in the 8 Branch MIMO system, the base station 1 may include eight antennas.

Figure 11:
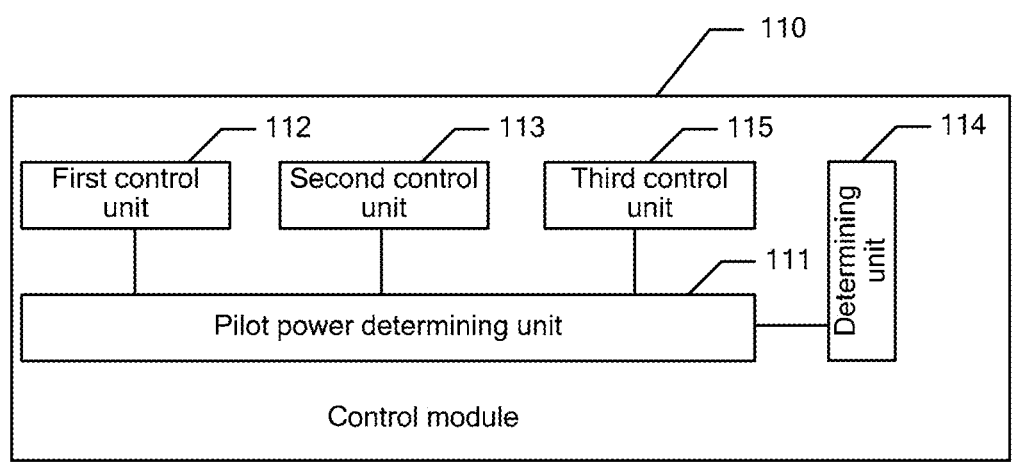
FIG. 11 is a schematic structural diagram of a pilot signal transmission control apparatus according to an embodiment.

Specifically, referring to FIG. 11, FIG. 11 is a schematic structural diagram of a pilot signal transmission control apparatus according to an embodiment of the present invention. The pilot signal transmission control apparatus in this embodiment specifically includes a control module 110.

The control module 110 is configured to control transmission of a CPICH1 over a first antenna of the base station and transmission of a CPICH2 over a second antenna of the base station;

control transmission of a pilot signal $CPICH_{k1}$ over a k1$^{th}$ antenna of the base station, where k1 is an integer greater than 2 and smaller than or equal to M; and upon determining that a terminal of a first category in a MIMO system is scheduled within a TTI, transmit a pilot signal $CPICH_{k2}$ over the k1$^{th}$ antenna within the TTI, where k2=M−2+k1.

Specifically, within the TTI, the control module 110 in this embodiment respectively determines, according to a power required by all terminals within the coverage area to perform both a CSI estimation and a channel estimation used for data demodulation, transmit power of the first antenna and transmit power of the second antenna;

within the TTI, the control module 110 respectively determines, according to a power required by all terminals of the first category within the coverage area to perform a CSI estimation, power for transmitting the $CPICH_{k1}$ over the k1$^{th}$ antenna; and within the TTI, the control module 110 determines whether a terminal of the first category in the MIMO system is scheduled; if a terminal of the first category is scheduled, respectively determines, according to the transmit power for transmitting the $CPICH_{k1}$, additional pilot transmit power required by the $k1^{th}$ antenna to ensure, within the coverage area, a channel estimation performed by all the terminals of the first category for data demodulation, and transmits the pilot signal $CPICH_{k2}$ over the $k1^{th}$ antenna within the TTI according to the corresponding determined additional pilot transmit power; if no terminal of the first category is scheduled, determines that power for transmitting the $CPICH_{k2}$ over the $k1^{th}$ antenna is 0, that is, not transmitting the $CPICH_{k2}$ within the TTI.

Further, as shown in FIG. 11, the control module 110 specifically includes:

a pilot power determining unit 111, configured to: within the TTI, respectively determine the transmit power of the first antenna and the transmit power of the second antenna according to a power required by all terminals within a coverage area to perform both a CSI estimation and a channel estimation used for data demodulation; and a first control unit 112, configured to respectively control, the transmission of the CPICH1 over the first antenna of a base station and the transmission of the CPICH2 over the second antenna of the base station according to the transmit power of the first antenna and the transmit power of the second antenna respectively determined by the pilot power determining unit 111.

In this embodiment, the pilot power determining unit 111 is further configured to: within the TTI, respectively determine the power for transmitting the $CPICH_{k1}$ over the $k1^{th}$ antenna according to a power required by all the terminals of the first category within the coverage area to perform a CSI estimation; and a second control unit 113, configured to control the transmission of the $CPICH_{k1}$ over the $k1^{th}$ antenna of the base station according to the power for transmitting the $CPICH_{k1}$ over the $k1^{th}$ antenna determined by the pilot power determining unit.

In this embodiment, the control module 110 may further include:

a determining unit 114, configured to determine whether a terminal of the first category in the MIMO system is scheduled within a TTI;

the pilot power determining unit 111 is further configured to: when the determining unit determines that a terminal of the first category is scheduled within the TTI, respectively determine, according to the power for transmitting the $CPICH_{k1}$, additional pilot transmit power required by the $k1^{th}$ antenna to ensure, within the coverage area, a channel estimation performed by all the terminals of the first category for data demodulation, and respectively determine that the additional pilot transmit power is power for transmitting the $CPICH_{k2}$ within the TTI; and is configured to determine that the power for transmitting the $CPICH_{k2}$ over the $k1^{th}$ antenna is 0 when the determining unit determines that no terminal of the first category is scheduled within the TTI; and a third control unit 115, configured to control transmission of the $CPICH_{k2}$ over the $k1^{th}$ antenna of the base station according to the power for transmitting the $CPICH_{k2}$ over the $k1^{th}$ antenna respectively determined by the pilot power determining unit.

The control module 110 transmits, through each unit in a MIMO system, a CPICH1 over a first antenna and a CPICH2 over a second antenna according to power required by all terminals within a coverage area to perform both a CSI estimation and a channel estimation used for data demodulation; and transmits a $CPICH_{k1}$ over an antenna except the first and second antennas according to power required by all terminals of a first category within the coverage area to perform a CSI estimation. Meanwhile, when it is determined that a terminal of the first category is scheduled within the TTI, a new pilot signal $CPICH_{k2}$ is additionally transmitted over another antenna, and its purpose is to ensure that channel estimation results of all terminals of the first category, within the coverage area, meet a requirement for performing data demodulation, by combining the two pilot signals, that is, the $CPICH_{k1}$ and the $CPICH_{k2}$ over another antenna. While ensuring that a terminal within the coverage area performs a channel estimation, this embodiment may further reduce interference to a traditional terminal in the system and reduce power consumption for transmitting a pilot signal.

Further, in other embodiments, the first control unit 112 may, according to a requirement, include the following:

a first determining sub-unit, configured to determine whether a terminal of a second category exists within a coverage area of a base station, where the terminal of the second category includes: a 2×1 MIMO terminal and/or a 2×2 MIMO terminal;

a first splitting sub-unit, configured to split a CPICH2 into two channels of pilot signals to obtain a CPICH2s and a CPICH2e when the first determining sub-unit determines that no terminal of the second category exists; and a first control sub-unit, configured to determine, according to a power required by all terminals within the coverage area to perform both a CSI estimation and a channel estimation used for data demodulation, power for transmitting a pilot signal over a first antenna, and transmit a CPICH1 over the first antenna.

The pilot power determining unit is further configured to determine, according to a power required by all terminals of the first category within the coverage area to perform a CSI estimation, power for transmitting the CPICH2s over a second antenna, and the first control sub-unit is further configured to control transmission of the CPICH2s over the second antenna according to the power for transmitting the CPICH2s over the second antenna determined by the pilot power determining unit;

when a terminal of the first category in a MIMO system is scheduled within a TTI, the pilot power determining unit is further configured to determine, according to the power for transmitting the CPICH2s, additional pilot transmit power required by the second antenna to ensure, within the coverage area, a channel estimation performed by all the terminals of the first category for data demodulation, and the first control sub-unit is further configured to control, according to the additional pilot transmit power determined by the pilot determining unit, transmission of the CPICH2e over the second antenna within the TTI within which a terminal of the first category is scheduled; and when no terminal of the first category in the MIMO system is scheduled within the TTI, the pilot power determining unit determines that transmit power for transmitting the CPICH2e over the second antenna is 0 within the TTI.

The first control unit 112 splits, by using each sub-unit, the pilot signal CPICH2 into two channels of pilot signals and obtains the CPICH2s and the CPICH2e, when no terminal of the second category, that is, no 2×1 MIMO terminal or 2×2 MIMO terminal exists in the MIMO system. The CPICH2s is transmitted over the second antenna according to power required by all the terminals of the first category within the coverage area to perform a channel estimation for CSI estimation. Meanwhile, when a terminal of the first category is scheduled only within a TTI, the new pilot signal CPICH2e is additionally transmitted over the second antenna, and its purpose is to ensure that channel estimation results of all the terminals of the first category, within the coverage area, meet a requirement for performing data demodulation, by combining the two pilot signals, that is, the CPICH2s and the CPICH2e over the second antenna. While ensuring that a terminal within the coverage area performs a channel estimation, this embodiment may further reduce interference to a traditional terminal in the system and reduce power consumption for transmitting a pilot signal.

It should be noted that, in other embodiments, the first control unit 112 may specifically include:

a second determining sub-unit, configured to determine whether a terminal of a second category and a terminal of a third category exist within a coverage area of a base station, where the terminal of the second category includes a 2×1 MIMO terminal and/or a 2×2 MIMO terminal, and the terminal of the third category includes a single-output single-input terminal and/or a single-output double-input terminal;

a second splitting sub-unit, configured to split a CPICH1 into two channels of pilot signals, that is, a CPICH1s and a CPICH1e and split a CPICH2 into two channels of pilot signals, that is, a CPICH2s and a CPICH2e, when the second determining sub-unit determines that no terminal of the second category or terminal of the third category exists; and a second control sub-unit, specifically configured to respectively determine, according to a power required by all terminals of a first category within a coverage area to perform a CSI estimation, power for transmitting the CPICH1s over a first antenna and power for transmitting the CPICH2s over a second antenna, and control transmission of the CPICH1s over the first antenna and transmission of the CPICH2s over the second antenna;

when a terminal of the first category in the MIMO system is scheduled within the TTI, the pilot power determining unit is further configured to determine, according to the power for transmitting the CPICH1s, additional pilot transmit power required by the first antenna to ensure, within the coverage area, a channel estimation performed by all the terminals of the first category for data demodulation, and the second control sub-unit is further configured to control, according to the additional pilot transmit power determined by the pilot power determining unit, transmission of the CPICH1e over the first antenna within the TTI within which a terminal of the first category is scheduled;

the pilot power determining unit is further configured to determine, according to the transmit power for transmitting the CPICH2s, additional pilot transmit power required by the second antenna to ensure, within the coverage area, a channel estimation performed by all the terminals of the first category for data demodulation, and the second control sub-unit is further configured to control, according to the additional pilot transmit power determined by the pilot power determining unit, the transmission of the CPICH2e over the second antenna within the TTI within which a terminal of the first category is scheduled; and when no terminal of the first category in the MIMO system is scheduled within the TTI, the pilot power determining unit determines that, within the TTI, transmit power for transmitting the CPICH1e over the first antenna is 0 and the power for transmitting the CPICH2e over the second antenna is 0.

The first control unit 112 may split, by using each sub-unit, the CPICH1 into two channels of pilot signals, that is, the CPICH1s and the CPICH1e, and split the CPICH2 into two channels of pilot signals, that is, the CPICH2s and the CPICH2e, when no terminal of the second category (that is, a 2×1 MIMO terminal or a 2×2 MIMO terminal) or terminal of the third category (a single-output single-input terminal or a single-output double-input terminal) exists in the MIMO system. Within all TTIs, the CPICH1s and the CPICH2s are transmitted, according to transmit power respectively determined according to a power required by all the terminals of the first category, within the coverage area, to perform a CSI estimation. The new pilot signals CPICH1e and CPICH2e are additionally transmitted over the first and the second antennas only when a terminal of the first category is scheduled, and its purpose is to ensure that channel estimation results of all the terminals of the first category, within the coverage area, meet a requirement for performing data demodulation, by combining the CPICH1s and the CPICH1e over the first antenna and combining the CPICH2s and the CPICH2e over the second antenna. While ensuring that a terminal within the coverage area performs a channel estimation, this embodiment may further reduce power consumption for transmitting a pilot signal.

The following describes in detail the MIMO terminal 2 and the MIMO terminal 3 in the system. In this embodiment, both the MIMO terminal 2 and the MIMO terminal 3 are terminals of the first category in the MIMO system, that is, a 4 Branch MIMO terminal in the 4 Branch MIMO system and an 8 Branch MIMO terminal in the 8 Branch MIMO system. In addition, a requirement of the MIMO terminal 2 for a channel estimation is not high, but a requirement of the MIMO terminal 3 for a channel estimation is high.

Figure 12:
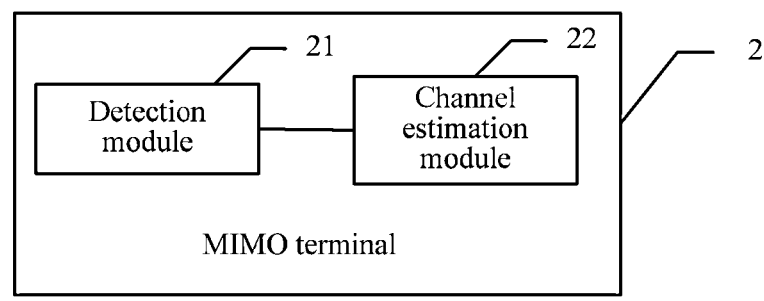
FIG. 12 is a schematic structural diagram of a MIMO terminal according to an embodiment.

Specifically, as shown in FIG. 12, the MIMO terminal 2 specifically includes:

a detection module 21, configured to detect, within each TTI, whether a terminal itself is scheduled;

a channel estimation module 22, configured to acquire, within a TTI, a CPICH1, a CPICH2, a $CPICH_{k1}$, and a $CPICH_{k2}$ to perform a channel estimation when the detection module 21 detects that the terminal itself is scheduled within the TTI; and acquire, within a TTI, a CPICH1, a CPICH2, and a $CPICH_{k1}$ to perform a channel estimation if the detection module 21 detects that the terminal itself is not scheduled in the TTI; where the CPICH1 and the CPICH2 are pilot signals transmitted over a first antenna and a second antenna on a base station side, the $CPICH_{k1}$ is a pilot signal transmitted over a $k1^{th}$ antenna on the base station side, and the $CPICH_{k2}$ is a pilot signal transmitted over the $k1^{th}$ antenna within a TTI when it is determined that a terminal of the first category in the MIMO system is scheduled on the base station side within the TTI, where k1 is an integer greater than 2 and smaller than or equal to M, and k2=M−2+k1.

Figure 13:
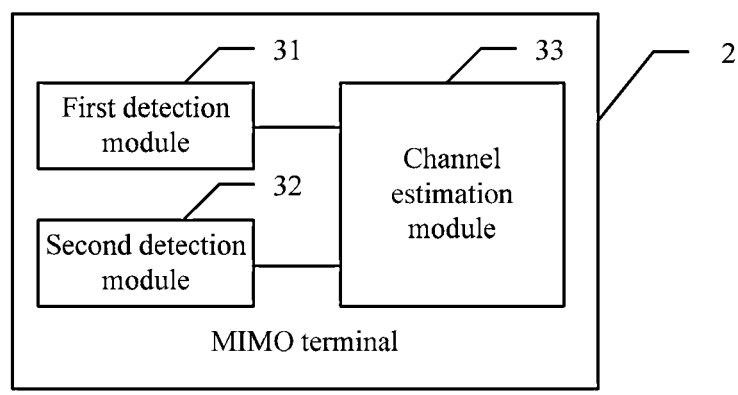
FIG. 13 is a schematic structural diagram of another MIMO terminal according to an embodiment.

Specifically, as shown in FIG. 13, the MIMO terminal 3 specifically includes:

a first detection module 31, configured to detect, within a TTI, whether a terminal itself is scheduled;

a second detection module 32, configured to further detect whether another terminal of the first category is scheduled within the TTI when the first detection module 31 detects that the terminal itself is not scheduled;

a channel estimation module 33, configured to acquire, a CPICH1, a CPICH2, a $CPICH_{k1}$, and a $CPICH_{k2}$ to perform a channel estimation within the TTI when the first detection module 31 detects that the terminal itself is scheduled within the TTI;

and is configured to acquire, a CPICH1, a CPICH2, a $CPICH_{k1}$, and a $CPICH_{k2}$ to perform a channel estimation within the TTI when the second detection module 32 detects that another terminal of the first category is scheduled within the TTI; and acquire a CPICH1, a CPICH2, and a $CPICH_{k1}$ to perform a channel estimation within the TTI when the second detection module 32 detects that no other terminal of the first category is scheduled within the TTI; where the CPICH1 and the CPICH2 are pilot signals transmitted over a first antenna and a second antenna on a base station side, the $CPICH_{k1}$ is a pilot signal transmitted over a $k1^{th}$ antenna on the base station side, and the $CPICH_{k2}$ is a pilot signal transmitted over the $k1^{th}$ antenna within a TTI when it is determined that a terminal of the first category in the MIMO system is scheduled on the base station side within the TTI, where k1 is an integer greater than 2 and smaller than or equal to M, and k2=M−2+k1.

The embodiment of the present invention determine, according to a situation in which a terminal of a first category in a MIMO system is scheduled, whether to additionally transmit a new pilot signal over another antenna except a first antenna and a second antenna, thereby better reducing interference to a traditional terminal in the MIMO system, on a basis of being compatible with the traditional terminal such as a single-output single-input terminal terminal, a single-output double-input terminal, a 2×1 MIMO terminal, or a 2×2 MIMO terminal; especially when a terminal of the first category such as the 4 Branch MIMO terminal in a 4 Branch MIMO system and the 8 Branch MIMO terminal in the 8 Branch MIMO system is not scheduled, interference to the traditional terminal is the lowest. The present invention ensures performance of the traditional terminal while ensuring that the terminal of the first category properly works in the MIMO system, and effectively reduces power consumption for transmitting a pilot signal.

Further, in actual deployment, a base station in a 4 Branch MIMO system may further perform a degradation of configuration on a terminal with a 4×4 MIMO capability in a downlink according to a performance or scheduling factor, so that the terminal works in a 2×4 MIMO mode, that is, the base station uses only first two antennas to transmit data to the terminal. In this case, this terminal for which only two antennas are used for transmitting data after degradation is categorized as a terminal of the second category rather than a terminal of the first category. Similarly, other types of 4 Branch MIMO terminals for which the base station uses only the first and the second antennas to transmit data after degradation are not categorized as terminals of the first category but are categorized as terminals of the second category; a 4 Branch MIMO terminal for which the base station uses only the first antenna to transmit data is categorized as a terminal of the third category rather than a terminal of the first category. An 8 Branch MIMO terminal in the 8 Branch MIMO system can be defined in a similar way during degradation.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The storage medium may include: a magnetic disk, an optical disc, a Read-Only Memory (ROM), a Random Access Memory (RAM), or the like.

The foregoing descriptions are merely exemplary embodiments of the present invention, but are not intended to limit the protection scope of the present invention. Therefore, any equivalent variation made according to the claims of the present invention shall fall within the protection scope of the present invention.

What is claimed is:

1. A pilot signal transmission method comprising:
   in a Multiple-Input Multiple-Output (MIMO) system, transmitting, by a base station, a pilot signal CPICH1 over a first antenna, and transmitting a pilot signal CPICH2 over a second antenna;
   transmitting a pilot signal $CPICH_{k1}$ over a $k1^{th}$ antenna, wherein k1 is an integer greater than 2 and smaller than or equal to M; and
   determining, whether a terminal of a first category in the MIMO system is scheduled within a Transmission Time Interval (TTI),
   if it is determined that the terminal of the first category is scheduled within the TTI, transmitting a pilot signal $CPICH_{k2}$ over the $k1^{th}$ antenna within the TTI, wherein k2=M−2+k1, and a value of M is determined according to a quantity of antennas of the base station in the MIMO system;
   if it is determined that no terminal of the first category is scheduled within the TTI, determining that no $CPICH_{k2}$ is transmitted over the $k1^{th}$ antenna within the TTI;
   wherein the CPICH1 and the CPICH2 are transmitted for all terminals within a coverage area, and the $CPICH_{k1}$ and $CPICH_{k2}$ are transmitted over the $k1^{th}$ antenna only for the terminal of the first category within the coverage area.

2. The method according to claim 1, wherein the MIMO system comprises a 4 Branch MIMO system or an 8 Branch MIMO system, and the terminal of the first category comprises a 4 Branch MIMO terminal in the 4 Branch MIMO system or an 8 Branch MIMO terminal in the 8 Branch MIMO system.

3. The method according to claim 1, wherein the transmitting the CPICH1 over the first antenna, and the transmitting the CPICH2 over the second antenna comprises:
   within the TTI, respectively determining, according to a power required by all terminals within the coverage area to perform both a channel state information (CSI) estimation and a channel estimation used for data demodulation, transmit power of the first antenna and transmit power of the second antenna; and
   in response to the determination of the transmit power of the first antenna and the transmit power of the second antenna, transmitting the CPICH1 over the first antenna according to the determined transmit power of the first antenna, and transmitting the CPICH2 over the second antenna according to the determined transmit power of the second antenna.

4. The method according to claim 1, wherein the transmitting the pilot signal $CPICH_{k1}$ over the $k1^{th}$ antenna comprises:
   within the TTI, respectively determining, according to a power required by all terminals of the first category within the coverage area to perform a channel state information (CSI) estimation, power for transmitting the $CPICH_{k1}$ over the $k1^{th}$ antenna; and
   in response to the determination of the power for transmitting the $CPICH_{k1}$, transmitting the pilot signal $CPICH_{k1}$ over the $k1^{th}$ antenna, according to the determined power for transmitting the $CPICH_{k1}$.

5. The method according to claim 1, wherein the transmitting the pilot signal CPICHk2 over the $k1^{th}$ antenna in the TTI, if it is determined that the terminal is scheduled within the TTI, further comprises:

if the terminal of the first category is scheduled, respectively determining, according to power for transmitting the $CPICH_{k1}$, additional pilot transmit power required by the $k1^{th}$ antenna to ensure, within the coverage area, a channel estimation performed by all terminals of the first category for data demodulation, and transmitting the pilot signal $CPICH_{k2}$ over the $k1^{th}$ antenna within the TTI according to the determined additional pilot transmit power.

6. The method according to claim 1, wherein the pilot signal $CPICH_{k1}$ transmitted over the $k1^{th}$ antenna and the pilot signal $CPICH_{k2}$ transmitted over the $k1^{th}$ antenna are respectively transmitted over different code channels.

7. The method according to claim 1, wherein the transmitting the CPICH1 over the first antenna, and the transmitting the CPICH2 over the second antenna comprises:
in the MIMO system, when determining that no terminal of a second category exists within the coverage area, splitting, by the base station, the CPICH2 into two channels of pilot signals and obtaining a CPICH2s and a CPICH2e, wherein the terminal of the second category comprises at least one of (a) a 2×1 MIMO terminal and (b) a 2×2 MIMO terminal;
determining, according to a power required by all terminals within the coverage area to perform both a channel state information (CSI) estimation and a channel estimation used for data demodulation, power for transmitting the pilot signal CPICH1 over the first antenna, and transmitting the CPICH1 over the first antenna, according to the determined power for transmitting the pilot signal CPICH1;
determining, according to power required by all terminals of the first category within the coverage area to perform a CSI estimation, power for transmitting the pilot signal CPICH2s over the second antenna, and transmitting the CPICH2s over the second antenna, according to the determined power for transmitting the pilot signal CPICH2s;
if a terminal of the first category is scheduled within the TTI, determining, according to the power for transmitting the CPICH2s, additional pilot transmit power required by the second antenna to ensure, within the coverage area, a channel estimation performed by all the terminals of the first category for data demodulation, and transmitting, according to the determined additional pilot transmit power, the CPICH2e over the second antenna within the TTI; and
if no terminal of the first category is scheduled within the TTI, determining that transmit power for transmitting the CPICH2e over the second antenna is 0 within the TTI.

8. The method according to claim 1, wherein the transmitting the CPICH1 over the first antenna, and the transmitting the CPICH2 over the second antenna comprises:
in the MIMO system, when determining that no terminal of a second category or no terminal of a third category exists within the coverage area, splitting, by the base station, the CPICH1 into two channels of pilot signals, a CPICH1 s and a CPICH1e, and splitting the CPICH2 into two channels of pilot signals, a CPICH2s and a CPICH2e, wherein the terminal of the second category comprises at least one of (a) a 2×1 MIMO terminal and (b) a 2×2 MIMO terminal, and the terminal of the third category comprises at least one of (a) a single-output single-input terminal and (b) a single-output double-input terminal;
respectively determining, according to a power required by all terminals of the first category within the coverage area to perform a channel state information (CSI) estimation, power for transmitting the CPICH1 s over the first antenna and power for transmitting the CPICH2s over the second antenna, and transmitting the CPICH1s over the first antenna and transmitting the CPICH2s over the second antenna, according to the determined power for transmitting the CPICH1s over the first antenna and the determined power for transmitting the CPICH2s, respectively;
when a terminal of the first category is scheduled within the TTI, determining, according to the power for transmitting the CPICH1s, additional pilot transmit power required by the first antenna to ensure, within the coverage area, a channel estimation performed by all terminals of the first category for data demodulation, and transmitting, according to the determined additional pilot transmit power, the CPICH1e over the first antenna within the TTI, and determining, according to the power for transmitting the CPICH2s, additional pilot transmit power required by the second antenna to ensure, within the coverage area, a channel estimation performed by all the terminals of the first category for data demodulation, and transmitting, according to the determined additional pilot transmit power, the CPICH2e over the first antenna within the TTI; and
when no terminal of a first category is scheduled within the TTI, determining that transmit power for transmitting the CPICH1e over the first antenna is 0 and transmit power for transmitting the CPICH2e over the second antenna is 0.

9. A channel estimation method comprising:
in a Multiple-Input Multiple-Output (MIMO) system, detecting, by a terminal of a first category, if the terminal is scheduled within a Transmission Time Interval (TTI);
if detecting that the terminal is scheduled, acquiring, within the TTI, a CPICH1, a CPICH2, a $CPICH_{k1}$, and a $CPICH_{k2}$ to perform a channel estimation;
if detecting that the terminal is not scheduled, acquiring, within the TTI, a CPICH1, a CPICH2, and a $CPICH_{k1}$ to perform the channel estimation; wherein
the CPICH1 and the CPICH2 are pilot signals transmitted over a first antenna and a second antenna on a base station, the $CPICH_{k1}$ is a pilot signal transmitted over a $k1^{th}$ antenna on the base station side, the $CPICH_{k2}$ is a pilot signal transmitted over the $k1^{th}$ antenna when it is determined that the terminal of the first category in the MIMO system is scheduled on the base station within the TTI, wherein k is an integer greater than 2 and smaller than or equal to M, and k2=M−2+k1, and a value of M is determined according to a quantity of antennas of the base station in the MIMO system;
the CPICH1 and the CPICH2 are transmitted for all terminals within a coverage area, and the $CPICH_{k1}$ and $CPICH_{k2}$ are transmitted over the $k1^{th}$ antenna only for the terminal of the first category within the coverage area.

10. A channel estimation method in a Multiple-Input Multiple-Output (MIMO) system comprising:
detecting, by a terminal of a first category, if the terminal is scheduled within a Transmission Time Interval (TTI);
if detecting that the terminal is scheduled, acquiring, within the TTI, a CPICH1, a CPICH2, a $CPICH_{k1}$, and a $CPICH_{k2}$ to perform a channel estimation; and if detecting that the terminal is not scheduled, further detecting whether another terminal of the first category is scheduled within the TTI; if the another terminal of the first category is scheduled within the TTI, acquiring the CPICH1, the CPICH2, the $CPICH_{k1}$, and the $CPICH_{k2}$ to perform the channel estimation; if no other terminal of the first category is scheduled within the TTI, acquiring the CPICH1, the CPICH2, and the $CPICH_{k1}$ to perform the channel estimation within the TTI; wherein the CPICH1 and the CPICH2 are pilot signals transmitted over a first antenna and a second antenna on a base station, the $CPICH_{k1}$ is a pilot signal transmitted over a $k1^{th}$ antenna on the base station, and the $CPICH_{k2}$ is a pilot signal transmitted over the $k1^{th}$ antenna when it is determined that the terminal of the first category in the MIMO system is scheduled on the base station within the TTI, wherein k1 is an integer greater than 2 and smaller than or equal to M, and k2=M−2+k1, and a value of M is determined according to a quantity of antennas of the base station in the MIMO system;

the CPICH1 and the CPICH2 are transmitted for all terminals within a coverage area and the $CPICH_{k1}$ and $CPICH_{k2}$ are transmitted over the $k1^{th}$ antenna only for the terminal of the first category within the coverage area.

11. A pilot signal transmission control apparatus, wherein the pilot signal transmission control apparatus is configured to control, in a Multiple-Input Multiple-Output (MIMO) system, transmission of a pilot signal over an antenna of a base station, comprising a processor and a non-transitory processor-readable medium having processor-executable instructions stored thereon, the processor-executable instructions including a control module, wherein the control module is configured to:

control transmission of a pilot signal CPICH1 over a first antenna of the base station and transmission of a pilot signal CPICH2 over a second antenna of the base station;

control transmission of a pilot signal $CPICH_{k1}$ over a $k1^{th}$ antenna of the base station, wherein k is an integer greater than 2 and smaller than or equal to M; and determine whether a terminal of a first category in the MIMO system is scheduled within a Transmission Time Interval (TTI), if it is determined that the terminal is scheduled within the TTI, transmit a pilot signal $CPICH_{k2}$ over the $k1^{th}$ antenna within the TTI, wherein k2=M−2+k1, and a value of M is determined according to a quantity of antennas of the base station in the MIMO system;

if it is determined that no terminal of the first category is scheduled within the TTI, determine that no $CPICH_{k2}$ is transmitted over the $k1^{th}$ antenna within the TTI;

wherein the CPICH1 and the CPICH2 are transmitted for all terminals within a coverage area, and the $CPICH_{k1}$ and $CPICH_{k2}$ are transmitted over the $k1^{th}$ antenna only for the terminal of the first category within the coverage area.

12. The apparatus according to claim 11, wherein the MIMO system comprises a 4 Branch MIMO system or an 8 Branch MIMO system, and the terminal of the first category comprises a 4 Branch MIMO terminal in the 4 Branch MIMO system or an 8 Branch MIMO terminal in the 8 Branch MIMO system.

13. The apparatus according to claim 11, wherein the control module comprises:

a pilot power determining unit, configured to: within the TTI, respectively determine transmit power of the first antenna and transmit power of the second antenna according to power required by all terminals within the coverage area to perform both a channel state information (CSI) estimation and a channel estimation used for data demodulation; and a first control unit, configured to respectively control the transmission of the CPICH1 over the first antenna of the base station and the transmission of the CPICH2 over the second antenna of the base station, according to the transmit power of the first antenna and the transmit power of the second antenna respectively determined by the pilot power determining unit.

14. The apparatus according to claim 11, wherein the control module comprises:

a pilot power determining unit, configured to: within the TTI, respectively determine power for transmitting the $CPICH_{k1}$ over the $k1^{th}$ antenna according to power required by all terminals of the first category within the coverage area to perform a channel state information (CSI) estimation; and a second control unit, configured to control the transmission of the $CPICH_{k1}$ over the $k1^{th}$ antenna of the base station according to the power for transmitting the $CPICH_{k1}$ over the $k1^{th}$ antenna respectively determined by the pilot power determining unit.

15. The apparatus according to claim 11, wherein the control module comprises:

a determining unit, configured to determine whether the terminal of the first category in the MIMO system is scheduled within the TTI;

a pilot power determining unit, configured to: when the determining unit determines that the terminal of the first category is scheduled within the TTI, respectively determine, according to power for transmitting the $CPICH_{k1}$, additional pilot transmit power required by the $k1^{th}$ antenna to ensure, within the coverage area, a channel estimation performed by all terminals of the first category for data demodulation, and respectively determine that the additional pilot transmit power is power for transmitting the $CPICH_{k2}$ within the TTI; and determine that power for transmitting the $CPICH_{k2}$ over the $k1^{th}$ antenna is 0 when the determining unit determines that no terminal of the first category is scheduled within the TTI; and a third control unit, configured to control the transmission of the $CPICH_{k2}$ over the $k1^{th}$ antenna of the base station, according to the power for transmitting the $CPICH_{k2}$ over the $k1^{th}$ antenna respectively determined by the pilot power determining unit.

16. The apparatus according to claim 13, wherein the first control unit comprises:

a first determining sub-unit, configured to determine whether a terminal of a second category exists within the coverage area of the base station, wherein the terminal of the second category comprises at least one of: (a) a 2×1 MIMO terminal and (b) a 2×2 MIMO terminal;

a first splitting sub-unit, configured to split the CPICH2 into two channels of pilot signals to obtain a CPICH2s and a CPICH2e when the first determining sub-unit determines that no terminal of the second category exists; and a first control sub-unit, configured to determine power for transmitting a pilot signal over the first antenna according to power required by all terminals within the coverage area to perform both the CSI estimation and the channel estimation used for data demodulation, and transmit the CPICH1 over the first antenna;

the pilot power determining unit is further configured to determine, according to a power required by all terminals of the first category within the coverage area to perform the CSI estimation, power for transmitting the CPICH2s over the second antenna, and the first control sub-unit is further configured to control, according to the power for transmitting the CPICH2s over the second antenna determined by the pilot power determining unit, transmission of the CPICH2s over the second antenna;

when the terminal of the first category in the MIMO system is scheduled within the TTI, the pilot power determining unit is further configured to determine, according to the power for transmitting the CPICH2s, additional pilot transmit power required by the second antenna to ensure, within the coverage area, a channel estimation performed by all the terminals of the first category for data demodulation, and the first control sub-unit is further configured to control, according to the additional pilot transmit power determined by the pilot power determining unit, transmission of the CPICH2e over the second antenna within the TTI; and when no terminal of the first category in the MIMO system is scheduled within the TTI, the pilot power determining unit determines that transmit power for transmitting the CPICH2e over the second antenna is 0 within the TTI.

17. The apparatus according to claim 13, wherein the first control unit comprises:

a second determining sub-unit, configured to determine whether a terminal of a second category and a terminal of a third category exist within the coverage area of the base station, wherein the terminal of the second category comprises at least one of (a) a 2×1 MIMO terminal and (b) a 2×2 MIMO terminal, and the terminal of the third category comprises at least one of (a) a single-output single-input terminal and (b) a single-output double-input terminal;

a second splitting sub-unit, configured to split the CPICH1 into two channels of pilot signals, a CPICH1s and a CPICH1e, and split the CPICH2 into two channels of pilot signals, a CPICH2s and a CPICH2e, when the second determining sub-unit determines that no terminal of the second category or terminal of the third category exists; and a second control sub-unit, further configured to respectively determine, according to the power required by all terminals of the first category within the coverage area to perform the CSI estimation, power for transmitting the CPICH1s over the first antenna and power for transmitting the CPICH2s over the second antenna, and control transmission of the CPICH1s over the first antenna and transmission of the CPICH2s over the second antenna;

when the terminal of the first category in the MIMO system is scheduled within the TTI, the pilot power determining unit is further configured to determine, according to the power for transmitting the CPICH1 s, additional pilot transmit power required by the first antenna to ensure, within the coverage area, a channel estimation performed by all the terminals of the first category for data demodulation, and the second control sub-unit is further configured to control, according to the additional pilot transmit power determined by the pilot power determining unit, transmission of the CPICH1e over the first antenna within the TTI within which the terminal of the first category is scheduled;

the pilot power determining unit is further configured to determine, according to the transmit power for transmitting the CPICH2s, additional pilot transmit power required by the second antenna to ensure, within the coverage area, a channel estimation performed by all the terminals of the first category for data demodulation, and the second control sub-unit is further configured to control, according to the additional pilot transmit power determined by the pilot power determining unit, transmission of the CPICH2e over the second antenna; and when no terminal of the first category in the MIMO system is scheduled within the TTI, the pilot power determining unit determines that, within the TTI, transmit power for transmitting the CPICH1e over the first antenna is 0 and transmit power for transmitting the CPICH2e over the second antenna is 0.

18. A Multiple-Input Multiple-Output (MIMO) terminal, wherein the MIMO terminal is a terminal of a first category in a MIMO system, and the terminal comprises a processor and a non-transitory processor-readable medium having processor-executable instructions stored thereon, the processor-executable instructions including a plurality of modules, the modules including:

a detection module, configured to detect, within each Transmission Time Interval (TTI), whether the terminal is scheduled;

a channel estimation module, configured to acquire the CPICH1, the CPICH2, the $CPICH_{k1}$, and the $CPICH_{k2}$ within the TTI to perform a channel estimation when the detection module detects that the terminal itself is scheduled within the TTI; and if the detection module detects that the terminal itself is not scheduled, acquire, a CPICH1, a CPICH2, and a $CPICH_{k1}$ to perform a channel estimation within the TTI;

wherein the CPICH1 and the CPICH2 are pilot signals transmitted over a first antenna and a second antenna on a base station, the $CPICH_{k1}$ is a pilot signal transmitted over a $k1^{th}$ antenna on the base station, and the $CPICH_{k2}$ is a pilot signal transmitted over the $k1^{th}$ antenna within a TTI when the terminal of the first category in the MIMO system is scheduled on the base station within the TTI, wherein k1 is an integer greater than 2 and smaller than or equal to M, and k2=M−2+k1, and a value of M is determined according to a quantity of antennas of the base station in the MIMO system, wherein the CPICH1 and the CPICH2 are transmitted for all terminals within a coverage area, and the $CPICH_{k1}$ and $CPICH_{k2}$ are transmitted over the $k1^{th}$ antenna only for the terminal of the first category within the coverage area.

19. A Multiple-Input Multiple-Output (MIMO) terminal, wherein the MIMO terminal is a terminal of a first category in a MIMO system, and the terminal comprises a processor and a non-transitory processor-readable medium having processor-executable instructions stored thereon, the processor-executable instructions including a plurality of modules, the modules including:

a first detection module, configured to detect, within a Transmission Time Interval (TTI), whether the terminal is scheduled;

a second detection module, configured to further detect whether another terminal of the first category is scheduled within the TTI when the first detection module detects that the terminal itself is not scheduled;

a channel estimation module, configured to acquire a CPICH1, a CPICH2, a $CPICH_{k1}$, and a $CPICH_{k2}$ to perform a channel estimation within the TTI when the first detection module detects that the terminal itself is scheduled within the TTI;

call the second detection module to detect whether the another terminal of the first category is scheduled within the TTI when the first detection module detects that the terminal itself is not scheduled within the TTI, acquire the CPICH1, the CPICH2, the $CPICH_{k1}$, and the $CPICH_{k2}$ to perform the channel estimation within the TTI when the second detection module detects that the another terminal of the first category is scheduled within the TTI, and acquire the CPICH1, the CPICH2, and the $CPICH_{k1}$ to perform the channel estimation within the TTI if the second detection module detects that no other terminal of the first category is scheduled; and wherein the CPICH1 and the CPICH2 are pilot signals transmitted over a first antenna and a second antenna on a base station, the $CPICH_{k1}$ is a pilot signal transmitted over a $k1^{th}$ antenna on the base station, and the $CPICH_{k2}$ is a pilot signal transmitted over the $k1^{th}$ antenna within the TTI when it is determined that the terminal of the first category in the MIMO system is scheduled on the base station within the TTI, wherein k1 is an integer greater than 2 and smaller than or equal to M, and k2=M−2+k1, and a value of M is determined according to a quantity of antennas of the base station in the MIMO system;

wherein the CPICH1 and the CPICH2 are transmitted for all terminals within a coverage area, and the $CPICH_{k1}$ and $CPICH_{k2}$ are transmitted over the $k1^{th}$ antenna only for the terminal of the first category within the coverage area.

\* \* \* \* \*

UNITED STATES PATENT AND TRADEMARK OFFICE
CERTIFICATE OF CORRECTION

| | | |
|---|---|---|
| PATENT NO. | : 9,673,880 B2 | Page 1 of 1 |
| APPLICATION NO. | : 14/293772 | |
| DATED | : June 6, 2017 | |
| INVENTOR(S) | : Tie et al. | |

It is certified that error appears in the above-identified patent and that said Letters Patent is hereby corrected as shown below:

On the Title Page

Inventors, city/country for inventor TIE, "Sanghai (CN)" should read -- Shanghai (CN) --.

In the Claims

Column 23, Line 60, "CPICH1 s" should read -- CPICH1 --.

Column 24, Line 4, "CPICH1 s" should read -- CPICH1s --.

Column 27, Line 61, "CPICH1 s" should read -- CPICH1s --.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*